United States Patent
Arnold et al.

(10) Patent No.: US 10,811,651 B2
(45) Date of Patent: Oct. 20, 2020

(54) POLYMER-BOUND CERAMIC PARTICLE BATTERY SEPARATOR COATING

(71) Applicant: Miltec UV International, LLC, Stevensville, MD (US)

(72) Inventors: John Arnold, Stevensville, MD (US); Gary E. Voelker, Bumpass, VA (US); Joe Fasolo, Edgewood, MD (US)

(73) Assignee: Miltec UV International, LLC, Stevensville, MD (US)

( * ) Notice: Subject to any disclaimer, the term of this patent is extended or adjusted under 35 U.S.C. 154(b) by 0 days.

(21) Appl. No.: 15/591,560

(22) Filed: May 10, 2017

(65) Prior Publication Data

US 2017/0244085 A1 Aug. 24, 2017

Related U.S. Application Data

(62) Division of application No. 14/335,367, filed on Jul. 18, 2014, now Pat. No. 9,680,143.
(Continued)

(51) Int. Cl.
| | |
|---|---|
| *H01M 2/14* | (2006.01) |
| *H01M 2/16* | (2006.01) |
| *H01M 10/0525* | (2010.01) |
| *H01M 10/052* | (2010.01) |
| *H01M 10/058* | (2010.01) |

(52) U.S. Cl.
CPC ........... *H01M 2/145* (2013.01); *H01M 2/166* (2013.01); *H01M 2/1646* (2013.01); *H01M 2/1653* (2013.01); *H01M 2/1686* (2013.01); *H01M 10/0525* (2013.01); *H01M 10/052* (2013.01); *H01M 10/058* (2013.01); *Y10T 29/49115* (2015.01)

(58) Field of Classification Search
CPC .................................................. H01M 2/1686
See application file for complete search history.

(56) References Cited

U.S. PATENT DOCUMENTS

| | | | |
|---|---|---|---|
| 3,904,437 A | 9/1975 | Specker | |
| 4,086,401 A | 4/1978 | Sundberg et al. | |
(Continued)

FOREIGN PATENT DOCUMENTS

| | | |
|---|---|---|
| CN | 101989651 A | 3/2011 |
| CN | 102627918 A | 8/2012 |
(Continued)

OTHER PUBLICATIONS

Machine Translation of WO 2012/053286 A1 (Year: 2012).*
(Continued)

*Primary Examiner* — Robert S Carrico
(74) *Attorney, Agent, or Firm* — Dority & Manning, P.A.

(57) ABSTRACT

Porous, electrically insulating, and electrochemically resistant surface coatings that strengthen and protect separators and that improve the operational safety of electrochemical devices using such separators, the use of ultraviolet (UV) or electron beam (EB) curable binders to secure an electrically insulating, porous, ceramic particle coating on separators, and methods of producing polymer-bound ceramic particle separator coatings, separators and electrochemical devices by UV or EB curing slurries of reactive liquid resins and ceramic particles.

22 Claims, 22 Drawing Sheets

Porous Separator Film Coated on Both Sides with ceramics in porous UV-cured binder.

Related U.S. Application Data

(60) Provisional application No. 61/892,885, filed on Oct. 18, 2013.

(56) References Cited

U.S. PATENT DOCUMENTS

| | | |
|---|---|---|
| 4,650,730 A | 3/1987 | Lundquist et al. |
| 4,906,718 A * | 3/1990 | Gornowicz ............ C08G 77/46 524/157 |
| 5,130,342 A | 7/1992 | McAllister et al. |
| 5,140,486 A | 8/1992 | Yokoyama et al. |
| 5,176,968 A | 1/1993 | Blasi et al. |
| 5,427,872 A | 6/1995 | Shen et al. |
| 5,529,707 A | 6/1996 | Kejha |
| 5,631,103 A | 5/1997 | Eschbach et al. |
| 5,654,114 A | 8/1997 | Kubota et al. |
| 5,705,084 A | 1/1998 | Kejha |
| 5,741,608 A | 4/1998 | Kojima et al. |
| 5,849,433 A | 12/1998 | Venugopal et al. |
| 5,853,916 A | 12/1998 | Venugopal et al. |
| 5,952,120 A | 9/1999 | Yu et al. |
| 6,242,135 B1 | 6/2001 | Mushiake |
| 6,287,720 B1 | 9/2001 | Yamashita et al. |
| 6,432,586 B1 | 8/2002 | Zhang |
| 6,447,958 B1 | 9/2002 | Shinohara et al. |
| 6,468,697 B1 | 10/2002 | Ferment et al. |
| 6,632,561 B1 | 10/2003 | Bauer et al. |
| 6,746,803 B1 | 6/2004 | Bauer et al. |
| 6,949,285 B1 | 9/2005 | Tobinaga et al. |
| 7,097,943 B2 | 8/2006 | Cho et al. |
| 7,135,254 B2 | 11/2006 | Yun et al. |
| 8,372,475 B2 | 2/2013 | Kim et al. |
| 2002/0146540 A1 | 10/2002 | Johnston et al. |
| 2003/0180623 A1 | 9/2003 | Yun et al. |
| 2005/0095504 A1 | 5/2005 | Kim et al. |
| 2005/0260492 A1 | 11/2005 | Tucholski et al. |
| 2006/0263693 A1* | 11/2006 | Kim ...................... H01M 2/145 429/251 |
| 2007/0232709 A1 | 10/2007 | Lee et al. |
| 2008/0245735 A1* | 10/2008 | Hennige .............. B01D 53/228 210/650 |
| 2009/0197158 A1 | 8/2009 | Ogawa et al. |
| 2010/0015533 A1 | 1/2010 | Deguchi et al. |
| 2010/0323230 A1 | 12/2010 | Lee et al. |
| 2011/0027658 A1 | 2/2011 | Kim et al. |
| 2011/0081575 A1 | 4/2011 | Voelker et al. |
| 2011/0165449 A1 | 7/2011 | Take et al. |
| 2011/0311855 A1 | 12/2011 | Peng et al. |
| 2012/0053286 A1 | 3/2012 | Zhao et al. |
| 2012/0315384 A1 | 12/2012 | Abd Elhamid et al. |
| 2013/0022868 A1 | 1/2013 | Yang et al. |
| 2013/0059192 A1 | 3/2013 | Kajita et al. |
| 2013/0084483 A1* | 4/2013 | Lee ...................... H01M 2/166 429/143 |
| 2013/0157107 A1 | 6/2013 | Chung et al. |
| 2013/0244116 A1 | 9/2013 | Watanabe et al. |
| 2013/0280584 A1 | 10/2013 | Matsumura |
| 2014/0329154 A1 | 11/2014 | Shinoda et al. |
| 2015/0155536 A1 | 6/2015 | Suzuki |

FOREIGN PATENT DOCUMENTS

| | | |
|---|---|---|
| CN | 103229330 A | 7/2013 |
| CN | 103460444 A | 12/2013 |
| DE | 19914272 A1 | 10/1999 |
| JP | 5-190208 | 7/1993 |
| JP | 11-67273 | 3/1999 |
| JP | 11-0803985 | 3/1999 |
| JP | 11-283674 | 10/1999 |
| JP | 2002118288 A | 4/2002 |
| JP | 2002-531924 A | 9/2002 |
| JP | 2011216376 A * | 10/2011 |
| JP | 2012033498 A * | 2/2012 |
| JP | 2013-246918 A | 12/2013 |
| WO | 98-59387 A2 | 12/1998 |
| WO | 2012053286 A1 | 4/2012 |
| WO | 2013107911 A1 | 7/2013 |
| WO | 2015/057815 | 4/2015 |

OTHER PUBLICATIONS

Communication with Supplementary European Search Report in EP15822731 dated Oct. 24, 2017.

Communication with Supplementary European Search Report in EP14853525 dated Apr. 11, 2017.

Abraham, et al., "Polymer Electrolytes Reinforced by Celgard Membranes", Technical Papers, Electrochemical Science and Technology, Journal of the Electrochemical Society, vol. 142, No. 3, pp. 683-687, Mar. 1995.

Abraham, "Directions in Secondary Lithium Battery Research and Development", Electrochimica Acta, vol. 38, No. 9, pp. 1233-1248, 1993,.

Crowther, et al., "Effect of Electrolyte Composition on Lithium Dendrite Growth", Journal of the Electrochemical Soceity, 155(11) pp. A806-A811 (2008).

Abraham, et al., "Characterization of Ether Electrolytes for Rechargeable Lithium Cells", Journal of the Electrochemical Society, vol. 129, No. 11, pp. 2404-2409 (1982).

Abraham, et al., "Rechargeability of the Ambient Temperature Cell Li/2Me-THF, LiAsF,F6/Cr0.5V0.5S2", Journal of the Electrochemical Society, Dec. 1983, pp. 2309-2314.

Abraham, et al., "Inorganic-Organic Composite Solid Polymer Electrolytes", Journal of the Electrochemical Society, 147(4), pp. 1251-1256, 2000.

Besenhard, Excerpts from Handbook of Battery Materials, 14 pages.

Orendorff, "The Role of Separators in Lithium-Ion Cell Society", The Electrochemical Society Interface, Summer 2012, pp. 61-65.

Song, et al., "Review of Gel-Type Polymer Electrolytes for Lithium-Ion Batteries", Journal of Power Sources 77(1999) pp. 183-197.

Doyle, et al., "Modeling of Galvanostatic Charge and Discharge of the Lithium/Polymer/Insertion Cell", J. Electrochem. Soc., vol. 140, No. 6, Jun. 1993, pp. 1526-1533.

IEEE Standard for Rechargeable Batteries for Cellular Telephones, IEEE Power Engineering Society, Livium 1725, 2006, 82 pages.

MTI as Ceramic Coated Membrane, <http://www.mtixtl.com/CeramicCoatedMembraneforLi-ionBatteryRandD-EQ-bsf-0016-500A.aspx>, Jan. 19, 2015, 2 pages.

Celgard C210 Product Information Data Sheet, 2 pages.

Celgard 2320 Product Information Data Sheet, 2 pages.

Besenhard, Handbook of Battery Materials, Feb. 5, 1999, 11 pages.

Lindon, Handbook of Batteries, 1995, 11 pages.

Pillot, The Rechargeable Battery Market and Main Trends 2012-2025, Presentation by Avicenne Energy, Apr. 11, 2013, 88 pages.

Geiger, et al., "Advanced Separators for Lithium Batteries", Paper presented at 11th International Seminar on Primary and Secondary Battery Technology and Applications, Feb. 28-Mar. 3, 1994, 13 pages.

Allcock, "Contemporary Polymer Chemistry", Chapter 21, The Testing of Polymers, 5 pages.

Venugopal, "Characterization of Microporous Separators for Lithium-Ion-Batteries", Journal of Power Sources 77 (1999), pp. 34-41.

Wang, et al., Poly(ethylene oxide)-silica hybrid materials for lithium battery application, 1999, Elsevier Science B.V., 39 (4), pp. 206-210.

Dec. 29, 2014—(WO) International Search Report and Written Opinion—App PCT/US2014/060656.

International Search Report and Written Opinion in PCT/US15/27176 dated Jul. 30, 2015.

Celgard Product Details, Celgard 2325, Celgard 2340 and Celgard 2400, date prior to Oct. 15, 2013, 3 pages.

"Coated," Collins English Dictionary. Collins Dictionaries. London: Collins, 2014. Credo Reference Web Accessed on: Aug. 12, 2015. <http://search.credoreference.com/content/entry/hcengdict/coated/0>.

Aug. 9, 2018—(CN) Office Action—App 201480067998.5.

(56) References Cited

OTHER PUBLICATIONS

Oct. 31, 2018—(JP) Notification of Reasons for Refusal—App 2016-549195 (Eng Trans).
Mar. 6, 2018—(CN) Office Action—App 201480067998.5.
Jul. 31, 2017—(CN) Office Action—App 201480067998.5.
Jul. 18, 2018—(EP) First Examination Report—App 14853525.5.
Apr. 4, 2019—(JP) Notification of Reasons for Refusal—App 2017-523767.

* cited by examiner

Porous Separator Film Coated on Both Sides with ceramics in porous UV-cured binder.

Uncoated Reference Separator
Charge Rate Performance

Uncoated Reference Separator
CYCLE PERFORMANCE

Uncoated Reference Separator
VOLTAGE PROFILE

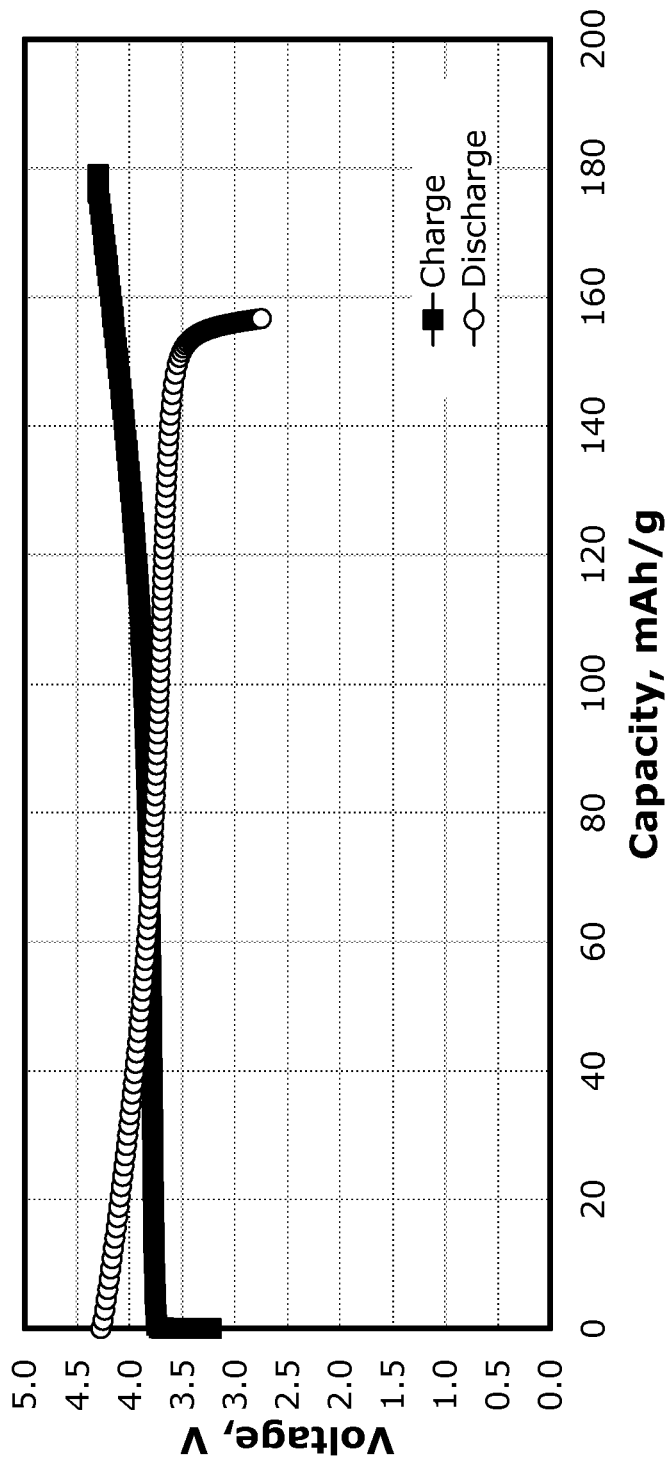

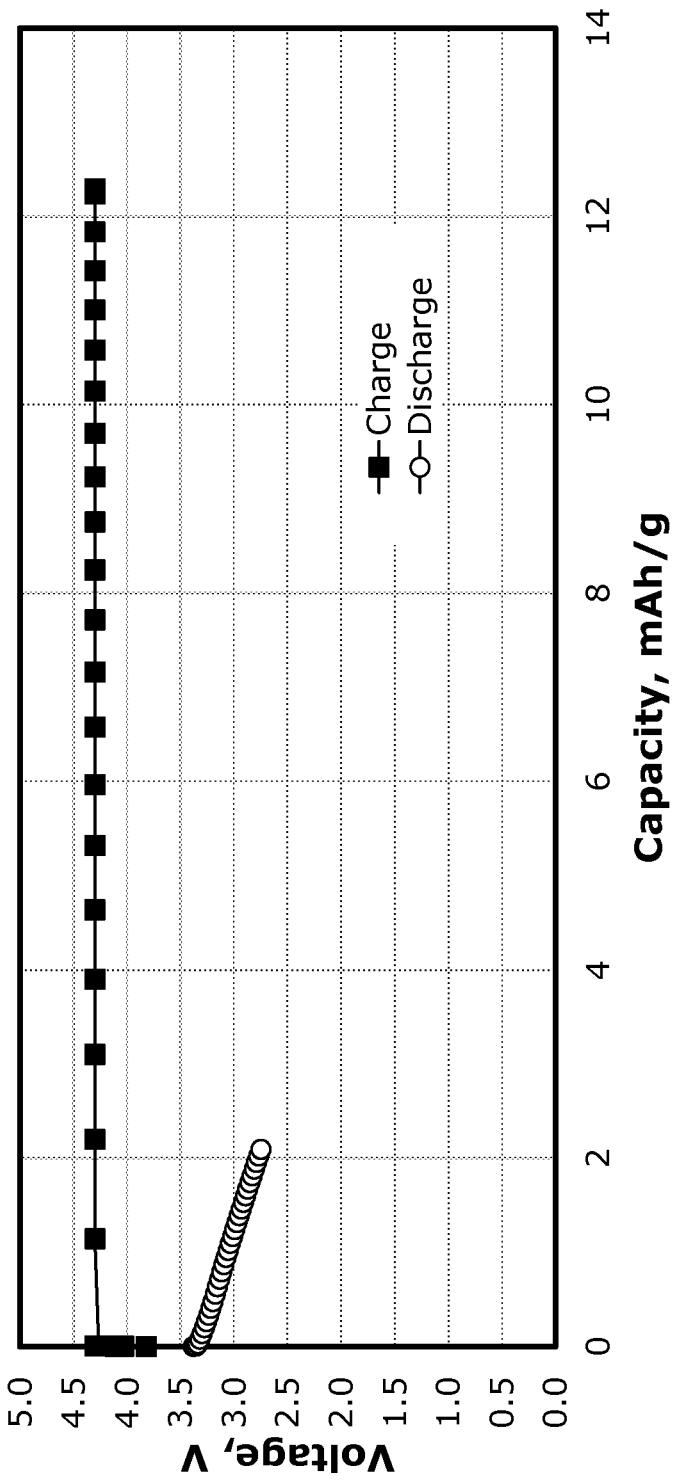

Coated Separator Sample #7
VOLTAGE PROFILE

Coated Separator Sample #7
Charge Rate Performance

Coated Separator Sample #7
CYCLE PERFORMANCE

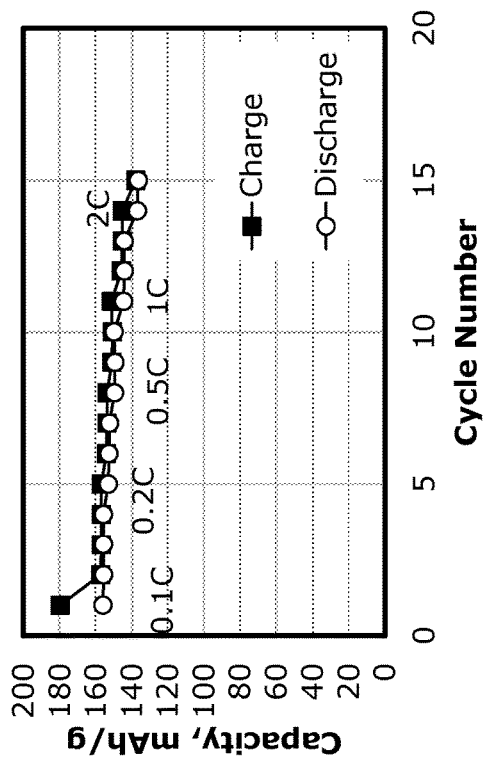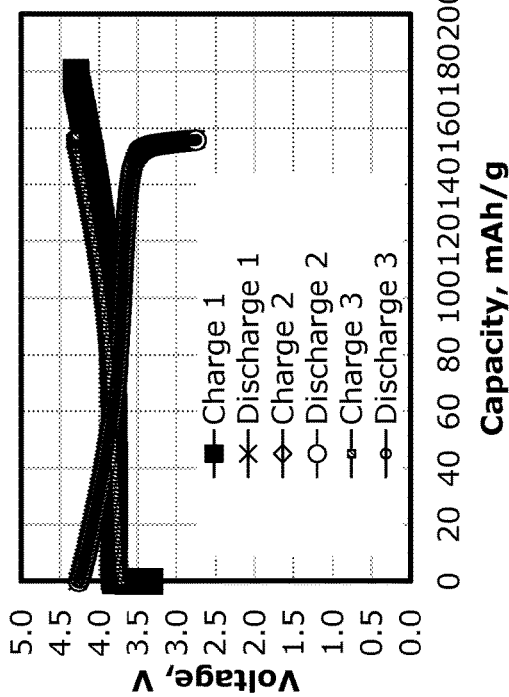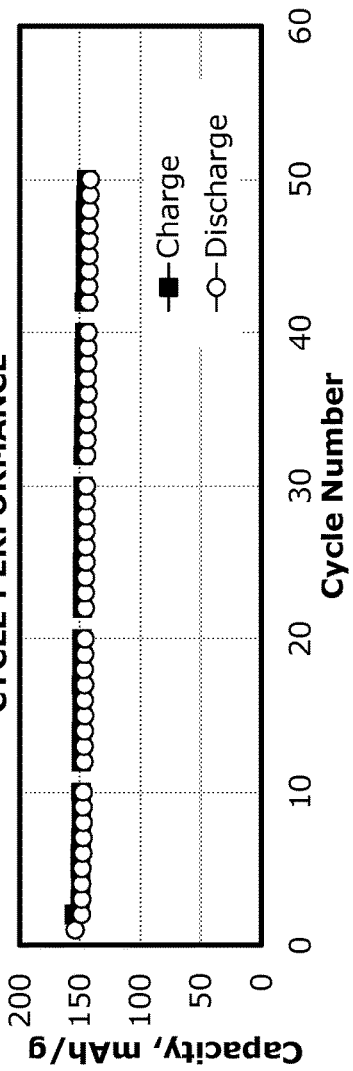

Coated Separator Sample #9
VOLTAGE PROFILE

Coated Separator Sample #9
Charge Rate Performance

Coated Separator Sample #9
CYCLE PERFORMANCE

Coated Separator Sample #10
VOLTAGE PROFILE

Coated Separator Sample #10
Charge Rate Performance

Coated Separator Sample #10
CYCLE PERFORMANCE

Coated Separator Sample #11
VOLTAGE PROFILE

Coated Separator Sample #11
Charge Rate Performance

Coated Separator Sample #11
CYCLE PERFORMANCE

Coated Separator Sample #12
VOLTAGE PROFILE

Coated Separator Sample #12
Charge Rate Performance

Coated Separator Sample #12
CYCLE PERFORMANCE

Coated Separator Sample #13
VOLTAGE PROFILE

Coated Separator Sample #13
Charge Rate Performance

Coated Separator Sample #13
CYCLE PERFORMANCE

Coated Separator Sample #14
Charge Rate Performance

Coated Separator Sample #14
CYCLE PERFORMANCE

Coated Separator Sample #14
VOLTAGE PROFILE

Coated Separator Sample #15
Charge Rate Performance

Coated Separator Sample #15
CYCLE PERFORMANCE

Coated Separator Sample #15
VOLTAGE PROFILE

Coated Separator Sample #17
VOLTAGE PROFILE

Coated Separator Sample #17
Charge Rate Performance

Coated Separator Sample #17
CYCLE PERFORMANCE

Coated Separator Sample #18
Charge Rate Performance

Coated Separator Sample #18
CYCLE PERFORMANCE

Coated Separator Sample #18
VOLTAGE PROFILE

POLYMER-BOUND CERAMIC PARTICLE BATTERY SEPARATOR COATING

The present application is a divisional of U.S. patent application Ser. No. 14/335,367, filed Jul. 18, 2014, which claims priority to and the benefit of U.S. Provisional Application No. 61/892,885, filed Oct. 18, 2013. Each of the above referenced applications is incorporated by reference herein in its entirety.

BACKGROUND

Electrochemical devices, such as batteries, are widely used in portable and auxiliary power supplies. The basic working unit of a battery is an electrochemical cell. The electrochemical cell includes two electrodes (an anode and a cathode) and an electrolyte. The battery electrolyte may be a liquid, solid, or gel. The electrolyte provides a path for ions to flow from the cathode to the anode (charging) as well as for the ions to flow from the anode to the cathode (discharging). The battery will not work if the cathode and anode make electrical contact.

A separator is used to "separate" the cathode from the anode, serving as an electrical barrier between the cathode and the anode. Although the separator is an electrical barrier, the separator may not be an ionic barrier. In some instances, to maximize ionic flow, the separator is as thin and as porous as possible. A separator may be a thin porous polymer film.

Void spaces in the separator polymer are filled with electrolyte that also fills pores in the anode and cathode coatings. An organic alkyl carbonate containing selected lithium salts is one example of a liquid electrolyte. The electrolytes offer a high mobility of ions (e.g., lithium ions) and are designed to be chemically inert when exposed to the voltage potential at the cathode and anode surfaces.

Due to its electrical storage capacity, the lithium secondary (rechargeable) battery has become a preferred electrical storage device for hybrid and electric vehicles, electric grid storage, and a multitude of portable consumer electronics such as laptop computers, cellphones, and hand tools. The higher storage capacity comes from a combination of higher voltage potential and greater energy density (ion density) within the electrode surfaces.

With higher voltages and energy density comes greater risk of fire. The separator is a key component to preventing fire. Fire can occur if 1) the battery discharges so quickly that the corresponding heat melts or shrinks the separator, 2) physical damage to the battery causes the anode and cathode to touch, or 3) electrolytic plating (irreversible side reactions) cause lithium ions to plate lithium metal on the anode in such a way that over time they develop lithium growths (e.g., dendrites, spikes, etc.) on the anode that keep growing until they form a metallic bridge to the cathode.

Example separator films include thermoplastic polypropylene (PP), polyethylene (PE), or coextruded blends of PE and PP. One of the advantages of the PE or PP separator is that these thermoplastic polymers flow when exposed to heat. This heat induced flow causes the pores in the separator to close. When the pores close, the separator is a barrier to ionic flow. So in cases of mild or gradual overheating states, the thermoplastic separator shuts the battery down.

Thermoplastic PE-PP, however, have several disadvantages. Thermoplastic PE-PP separators are very similar in strength and heat resistance to that of a common kitchen sandwich bag. In the event of battery rupture, PE-PP separators provide insignificant mechanical strength; and in the event of fast discharge, PE-PP separators do not have the heat resistance to remain in place. In high heat conditions, the polymer separator can go from melting, to curling, depolymerization, and decomposition. As the polymer separator film curls or decomposes, the barrier between the cathode and anode vanishes. In this state, fire will break out if the battery cannot be shut down immediately.

In view of fire safety considerations, a superior, porous, mechanically strong, heat resistant, and stable separator is desired, wherein the separator does not form cracks or cause short circuits due to shrinkage when the electrochemical cell is either heated or compressed.

BRIEF SUMMARY

This Summary is provided to introduce a selection of concepts in a simplified form that are further described below in the Detailed Description. This Summary is not intended to identify key or essential features.

Porous, electrically insulating (e.g., non-conductive), and electrochemically resistant surface coatings that strengthen and protect separators and that improve the operational safety of electrochemical devices using such separators are disclosed. Methods of making such coatings, separators and electrochemical devices by ultraviolet (UV) or electron beam (EB) curing slurries of reactive liquid resins (e.g., monomers and/or oligomers) and ceramic particles are further disclosed.

One or more embodiments are directed to a UV or EB cured coating comprising: a polymeric material including a UV or EB cured matrix comprising a crosslink reaction product from a UV water-based mixture or from one or more precursors selected from one or more monomers, one or more oligomers, or a combination of one or more monomers and one or more oligomers; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic.

Further embodiments are directed to a UV or EB cured coating comprising: a polymeric material including a UV or EB cured matrix comprising a crosslink reaction product from a UV curable epoxy; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink reaction product from a UV curable silicone; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink reaction product from a UV curable urethane; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink reaction product from a UV curable rubber; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Further embodiments are directed to a UV or EB cured coating comprising: a polymeric material including a UV or EB cured matrix comprising a crosslink reaction product from a UV curable thioester; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof. In various embodiments, the UV or EB cured matrix is nonionic.

Various embodiments are directed to a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In some embodiments, the separator is a polymeric film. In certain embodiments, the separator is a trilayer separator. According to some embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

Certain embodiments are directed to a pattern coated separator comprising a separator; and any of the UV or EB cured coatings discussed above adhered to at least one surface of the separator in a pattern. For instance, certain embodiments are directed to a coated separator comprising a separator; and a UV or EB cured coating adhered to at least one surface of the separator in a pattern, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In some embodiments, the separator is a polymeric film. In other embodiments, the separator is a trilayer separator. According to certain embodiments, the UV or EB cured coating is adhered in a pattern to the top surface or the bottom surface of the separator, but not to both the top surface and the bottom surface. In other embodiments, the UV or EB cured coating is adhered to both the top surface and the bottom surface of the separator in a pattern. According to various embodiments, the pattern coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the patterned UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

Other embodiments are directed to an electrochemical device having a coated separator comprising a separator; and any of the UV or EB cured coatings discussed above adhered to at least one surface of the separator. For instance, certain embodiments are directed to an electrochemical device having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is nonionic. In certain embodiments, the separator is a polymeric film. In some embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). According to various embodiments, the electrochemical device includes an anode, a cathode, an electrolyte, a current collector, or a combination thereof. In certain embodiments, the electrochemical device is an alkali ion battery (e.g., a lithium ion battery).

Still other embodiments are directed to a lithium ion battery having a coated separator comprising a separator; and any of the UV or EB cured coatings discussed above adhered to at least one surface of the separator. For instance, certain embodiments are directed to a lithium ion battery having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the one or more precursors include a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In certain embodiments, the separator is a polymeric film. In some embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be applied to the separator in a continuous coat, a pattern, or a combination thereof, and may completely or partially cover the top surface of the separator, bottom surface of the separator, or a combination thereof. According to various embodiments, the coated separator suppresses ionic flow through pores of the separator and stays electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.). According to various embodiments, the lithium ion battery includes an anode, a cathode, an electrolyte, a current collector, or a combination thereof.

Various embodiments include a method of making each and any of the coated separators discussed above or any of the electrochemical devices incorporating any of the coated separators discussed above, said method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to UV or EB radiation, thereby curing the curable binder mixture and forming a UV or EB cured matrix. The UV or EB cured matrix adheres to at least one surface of the separator and the ceramic particulate material is distributed substantially throughout the UV or EB cured matrix. In some embodiments, the slurry further comprises a solvent, photoinitiator, free-radical initiator, dispersant, adhesion promoter, wetting agent, silane-coated particle, dark cure additive, co-initiator, blowing agent, or a combination thereof. In other embodiments, the slurry does not comprise a solvent. The slurry may be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. According to certain embodiments, the method may also include positioning the coated separator in an electrochemical device and then charging and discharging the electrochemical device. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. In various embodiments, the ceramic particulate material is bound to the UV or EB cured matrix, bound to the separator by the UV or EB cured matrix, and includes at least one thermally conductive material that is electrically insulating. In some embodiments, the ceramic particulate material is an aluminum oxide (e.g., aluminum oxide ($Al_2O_3$), aluminum oxide hydroxide, etc.), silicon oxide, silicon carbide, titanium dioxide, magnesium oxide, boron nitride, or a combination thereof, and the curable binder mixture includes a UV water-based mixture, UV curable epoxy, UV curable silicone, UV curable urethane, UV curable rubber, UV curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof. In various embodiments, the UV or EB cured matrix is non-ionic. In some embodiments, the separator is a polymeric film. In other embodiments, the separator is a trilayer separator. According to certain embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator.

Various embodiments are directed to a cured coating comprising: a polymeric material including a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof.

Still further embodiments are directed to a coated separator comprising a separator; and a cured coating adhered to at least one surface of the separator, said cured coating comprising: a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof.

Certain embodiments are directed to a pattern coated separator comprising a separator; and a cured coating adhered to at least one surface of the separator in a pattern, said cured coating comprising: a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to certain embodiments, the cured coating is adhered in a pattern to the top surface or the bottom surface of the separator, but not to both the top surface and the bottom surface. In other embodiments, the cured coating is adhered to both the top surface and the bottom surface of the separator in a pattern.

Other embodiments are directed to an electrochemical device having a coated separator comprising a separator; and a cured coating adhered to at least one surface of the separator, said cured coating comprising: a polymeric material including a cured matrix comprising a crosslink reaction product from a precursor and a cross-linking agent; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. A wide variety of cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. According to some embodiments, the cured coating is adhered to the top surface or the bottom surface of the separator, but not to both the top surface and the bottom surface. In other embodiments, the cured coating is adhered to both the top surface and the bottom surface of the separator. The cured coating may be applied to the separator in a continuous coat, a pattern, or a combination thereof, and may completely or partially cover the top surface of the separator, bottom surface of the separator, or a combination thereof. In some embodiments, the electrochemical device is an alkali ion battery (e.g., a lithium ion battery).

Various embodiments include a method of making a coated separator or an electrochemical device incorporating a coated separator, said method comprising: mixing a curable binder mixture comprising a precursor and a cross-linking agent with a ceramic particulate material to form a slurry; applying the slurry to at least one surface of a separator to form a slurry coated separator; and curing the slurry coated separator, thereby curing the curable binder mixture. Various cross-linking agents are available and may be used in various embodiments. Illustrative cross-linking agents usable in various embodiments include, but are not limited to, (poly)aziridine(s), metal driers, or peroxides. In certain embodiments, the precursor is a water-based acrylic, a water-based urethane, or a combination thereof. The slurry may be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. According to certain embodiments, the method may also include positioning the coated separator in an electrochemical device and then charging and discharging the electrochemical device.

Additional embodiments are described herein.

BRIEF DESCRIPTION OF THE DRAWINGS

Some embodiments are illustrated by way of example, and not by way of limitation, in the figures of the accompanying drawings.

FIG. 5 illustrates the voltage profile of a coated separator according to one or more embodiments.

FIG. 10 illustrates the voltage profile of a coated separator according to one or more embodiments.

FIG. 12A illustrates the voltage profile of a coated separator according to one or more embodiments.

FIG. 12B illustrates the charge rate performance of a coated separator according to one or more embodiments.

FIG. 12C illustrates the cycle performance of a coated separator according to one or more embodiments.

DETAILED DESCRIPTION

Ultraviolet (UV) or electron beam (EB) curing slurries of reactive liquid resins (e.g., monomers and/or oligomers) and ceramic particles can be used to strengthen and protect separators and improve the operational safety of electrochemical devices using such separators. Presented herein are coated separators having dimensional stability at high temperature, a shutdown mechanism, high porosity, and mechanical strength. Such coated separators may be manufactured by an improved process using UV or EB cured materials to bind ceramic particle coatings to a polymeric membrane separator.

Reference now will be made in detail to various embodiments, one or more examples of which are set forth below. Each example is provided by way of explanation, not limitation of the disclosure. It will be apparent to those skilled in the art that various modifications and variations may be made without departing from the scope or spirit of the disclosure. For instance, features illustrated or described as part of one embodiment, may be used in another embodiment to yield a still further embodiment. Thus, it is intended that the disclosure cover such modifications and variations.

Certain variations are directed to electrochemical device (e.g., lithium secondary battery) separators utilizing particular EB or actinic UV curable binders, and to methods for manufacturing the same. According to various embodiments, particular EB and/or UV curable materials may be utilized as binders in manufacturing coated separators having a thin ceramic coating layer, as the particular EB and/or UV curable materials demonstrate good adhesion to polymeric (e.g., polyethylene, polypropylene, or combinations thereof) separators upon curing, while providing the necessary resistance to harsh electrolytic material present in an electrochemical device and retaining the necessary separator porosity.

Various embodiments are directed to a UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating.

Figure 1:
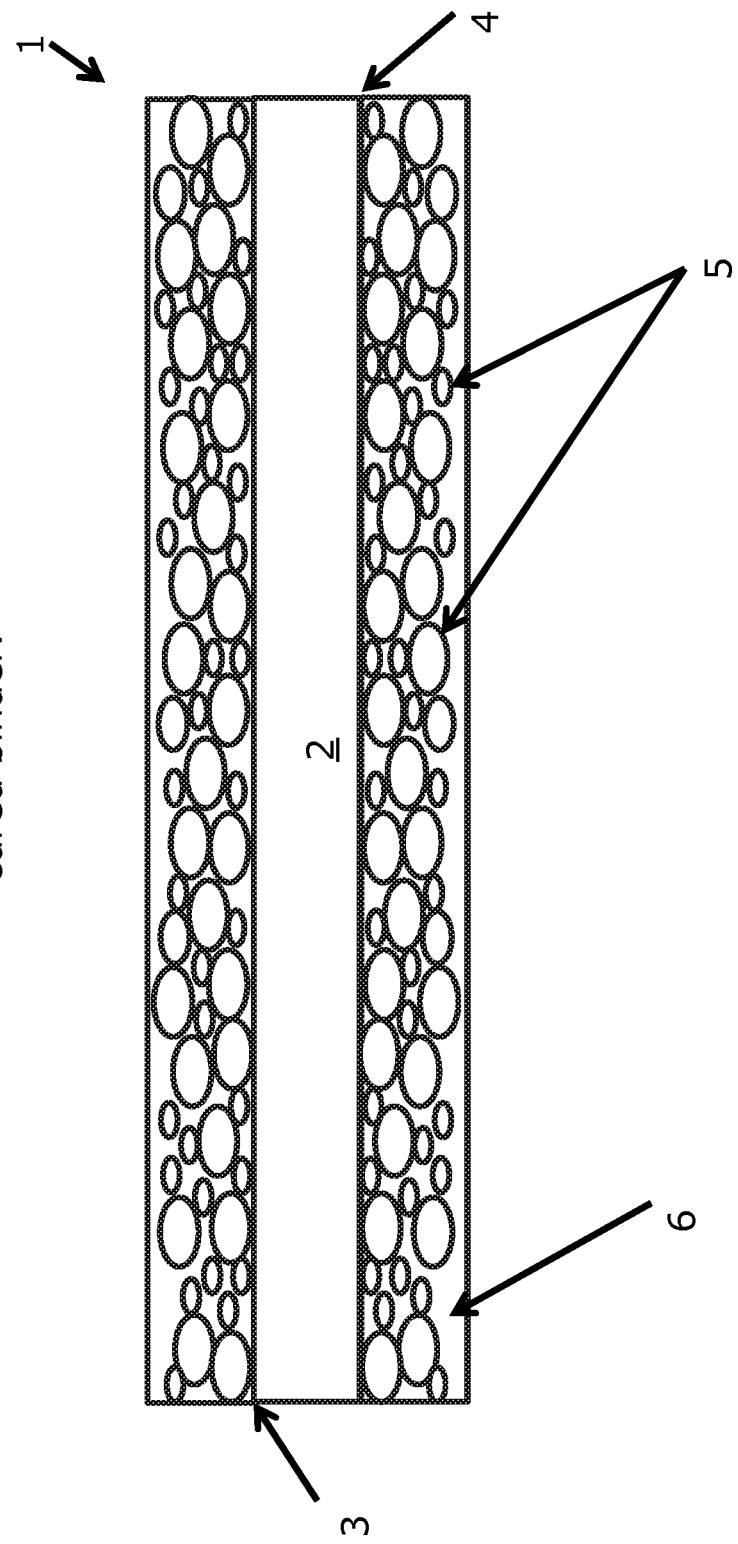
FIG. 1 illustrates a cross-sectional view of a coated separator according to one or more embodiments.

The UV or EB cured coating may be used to strengthen and protect separators and improve the operational safety of electrochemical devices using such separators. A cross sectional view of a coated separator 1 according to one or more embodiments is illustrated in FIG. 1. The porous separator film 2 of FIG. 1 is coated on both the top side 3 and bottom side 4 with ceramic particles 5 in a porous UV-cured binder 6.

While the ceramic particles are not limited to any particular shape, round or rounded particles minimize tearing stresses of the fragile polymer (e.g., polyolefin) film of the separator when the battery is assembled as well as when the battery expands and contracts in normal operation. The ceramic particles 5 of FIG. 1 are examples of round or rounded particles. A UV or EB cured coating may have ceramic particles having all the same or similar shape in some embodiments. In other embodiments, the ceramic particles of a UV or EB cured coating may be of varying shapes. According to further embodiments, the ceramic particles of the coating on the top side of the separator may be a different shape than the ceramic particles of the coating on the bottom side of the separator. In some embodiments, the ceramic particles can be hollow to provide greater porosity to the final UV or EB cured coating. Examples of ceramic particle shapes usable in various embodiments include, but are not limited to, a simple sphere or a more complicated shape such as a zeolite.

The size of the particles of the ceramic particulate material is largely limited by the thickness of the UV or EB cured coating. For instance, there may be no need to use particles that would significantly exceed the thickness of the coating. The actual particle size is determined in the design of the electrochemical device. For example, a temporary battery designed for single use may use a very thin coated separator (e.g., 1 µm thickness) and thus, relatively small ceramic particles (e.g., 0.1 µm) may be suitable. However, a power tool (high discharge) or a vehicle battery (high energy density) may require a long life and greater safety considerations and thus, some embodiments include a coated separator 25 µm thick with 10 µm ceramic particles in the coating. In some embodiments, the ceramic particles are all about the same size. In other embodiments, the ceramic particulate material contains particles of varying size. For instance, the porous UV-cured binder 6 of FIG. 1 is filled with ceramic particles 5 having different sizes. According to further embodiments, the ceramic particles of the coating on the top side of the separator may be a different size than the ceramic particles of the coating on the bottom side of the separator. Adding particles of different sizes increases particle to particle contact and the packing density, which increases the thermal conductivity and safety of the coating.

In certain embodiments, the particles of the ceramic particulate material have a particle size of from about 1 nm to about 10 µm. In other embodiments, the particles of the ceramic particulate material have a particle size of from about 1 nm to about 9.5 µm, from about 1 nm to about 9 µm, from about 1 nm to about 8.5 µm, from about 1 nm to about 8 µm, from about 1 nm to about 7.5 µm, from about 1 nm to about 7 µm, from about 1 nm to about 6.5 µm, from about 1 nm to about 6 µm, from about 1 nm to about 5.5 µm, from about 1 nm to about 5 µm, from about 1 nm to about 4.5 µm, from about 1 nm to about 4 µm, from about 1 nm to about 3.5 µm, from about 1 nm to about 3 µm, from about 1 nm to about 2.5 µm, from about 1 nm to about 2 µm, from about 1 nm to about 1.5 µm, from about 1 nm to about 1 µm, from about 2 nm to about 10 µm, from about 2 nm to about 9.5 µm, from about 2 nm to about 9 µm, from about 2 nm to about 8.5 µm, from about 2 nm to about 8 µm, from about 2 nm to about 7.5 µm, from about 2 nm to about 7 µm, from about 2 nm to about 6.5 µm, from about 2 nm to about 6 µm, from about 2 nm to about 5.5 µm, from about 2 nm to about 5 µm, from about 2 nm to about 4.5 µm, from about 2 nm to about 4 µm, from about 2 nm to about 3.5 µm, from about 2 nm to about 3 µm, from about 2 nm to about 2.5 µm, from about 0.1 µm to about 10 µm, from about 0.1 µm to about 9.5 µm, from about 0.1 µm to about 9 µm, from about 0.1 µm to about 8.5 µm, from about 0.1 µm to about 8 µm, from about 0.1 µm to about 7.5 µm, from about 0.1 µm to about 7 µm, from about 0.1 µm to about 6.5 µm, from about 0.1 µm to about 6 µm, from about 0.1 µm to about 5.5 µm, from about 0.1 µm to about 5 µm, from about 0.1 µm to about 4.5 µm, from about 0.1 µm to about 4 µm, from about 0.1 µm to about 3.5 µm, from about 0.1 µm to about 3 µm, from about 0.1 µm to about 2.5 µm, from about 0.1 µm to about 2 µm, from about 0.1 µm to about 1.5 µm, from about 0.1 µm to about 1 µm, or a combination thereof.

In some embodiments, the particles of the ceramic particulate material have a particle size of about 10 µm, about 9.5 µm, about 9 µm, about 8.5 µm, about 8 µm, about 7.5 µm, about 7 µm, about 6.5 µm, about 6 µm, about 5.5 µm, about 5 µm, about 4.5 µm, about 4 µm, about 3.5 µm, about 3 µm, about 2.5 µm, about 2 µm, about 1.5 µm, about 1 µm, about 0.9 µm, about 0.8 µm, about 0.7 µm, about 0.6 µm, about 0.5 µm, about 0.4 µm, about 0.3 µm, about 0.2 µm, about 0.1 µm, about 0.09 µm, about 0.08 µm, about 0.07 µm, about 0.06 µm, about 0.05 µm, about 0.04 µm, about 0.03 µm, about 0.02 µm, about 0.01 µm, about 1 nm, or a combination thereof.

Various ceramic materials are available and may be used in various embodiments. According to certain embodiments, the ceramic particulate material comprises at least one thermally conductive material that is electrically insulating (e.g., having a resistance of at least $10^7$ ohms). In various embodiments, the ceramic particulate material has an electrical conductivity less than that of the curable binder mixture and less than that of the uncoated separator film. In certain embodiments, the ceramic particles of the coating allow the thermal conductivity of the separator to be increased without increasing the electrical conductivity of the separator. Examples of ceramic materials usable in various embodiments include, but are not limited to, an aluminum oxide (e.g., aluminum oxide ($Al_2O_3$), aluminum oxide hydroxide, etc.), silicon oxide, silicon carbide, titanium dioxide, magnesium oxide, boron nitride, other compounds that are electrically insulating but have appreciable thermal conductivity, and combinations thereof. The cured coating of the various embodiments includes at least one type of ceramic material. In some embodiments, the cured coating may include combinations of two or more types of ceramic materials, including combinations of any two or more, three or more, four or more, five or more, etc. of the types of ceramic materials described herein. For example, in certain embodiments, the cured coating may include one of an aluminum oxide, silicon oxide, silicon carbide, titanium dioxide, magnesium oxide, boron nitride, or another compound that is electrically insulating but has appreciable thermal conductivity. In other embodiments, the cured coating may include two ceramic materials (e.g., aluminum oxide ($Al_2O_3$) and aluminum oxide hydroxide, an aluminum oxide and silicon oxide, an aluminum oxide and silicon carbide, an aluminum oxide and titanium dioxide, an aluminum oxide and magnesium oxide, an aluminum oxide and boron nitride, an aluminum oxide and another compound that is electrically insulating but has appreciable thermal conductivity, silicon oxide and titanium dioxide, silicon oxide and magnesium oxide, etc.), three ceramic materials (e.g., aluminum oxide (Al$_2$O$_3$), silicon oxide, and aluminum oxide hydroxide; an aluminum oxide, silicon oxide, and silicon carbide; an aluminum oxide, silicon oxide, and titanium dioxide; an aluminum oxide, silicon oxide, and magnesium oxide; an aluminum oxide, silicon oxide, and boron nitride; an aluminum oxide, silicon oxide, and another compound that is electrically insulating but has appreciable thermal conductivity; silicon oxide, titanium dioxide, and magnesium oxide; etc.), four ceramic materials (e.g., aluminum oxide (Al$_2$O$_3$), silicon oxide, silicon carbide, and aluminum oxide hydroxide; an aluminum oxide, silicon oxide, silicon carbide, and titanium dioxide; an aluminum oxide, silicon oxide, silicon carbide, and magnesium oxide; an aluminum oxide, silicon oxide, silicon carbide, and boron nitride; an aluminum oxide, silicon oxide, silicon carbide, and another compound that is electrically insulating but has appreciable thermal conductivity; silicon oxide, silicon carbide, titanium dioxide, and magnesium oxide; silicon oxide, silicon carbide, titanium dioxide, and boron nitride; etc.), five ceramic materials (e.g., aluminum oxide (Al$_2$O$_3$), silicon oxide, silicon carbide, titanium dioxide, and aluminum oxide hydroxide; an aluminum oxide, silicon oxide, silicon carbide, titanium dioxide, and magnesium oxide; an aluminum oxide, silicon oxide, silicon carbide, titanium dioxide, and boron nitride; an aluminum oxide, silicon oxide, silicon carbide, titanium dioxide, and another compound that is electrically insulating but has appreciable thermal conductivity; etc.), six ceramic materials (e.g., aluminum oxide (Al$_2$O$_3$), silicon oxide, silicon carbide, titanium dioxide, magnesium oxide, and aluminum oxide hydroxide; an aluminum oxide, silicon oxide, silicon carbide, titanium dioxide, magnesium oxide, and boron nitride; an aluminum oxide, silicon oxide, silicon carbide, titanium dioxide, magnesium oxide, and another compound that is electrically insulating but has appreciable thermal conductivity; etc.), or seven ceramic materials (e.g., aluminum oxide (Al$_2$O$_3$), silicon oxide, silicon carbide, titanium dioxide, magnesium oxide, boron nitride, and aluminum oxide hydroxide; an aluminum oxide, silicon oxide, silicon carbide, titanium dioxide, magnesium oxide, boron nitride, and another compound that is electrically insulating but has appreciable thermal conductivity; etc.).

The cured coating of various embodiments comprises ceramic particulate material in an amount of from about 30 to about 98 weight percent based on the total weight of the cured coating. In some embodiments, the cured coating comprises ceramic particulate material in an amount of from about 30 to about 95 weight percent, from about 30 to about 90 weight percent, from about 30 to about 85 weight percent, from about 30 to about 80 weight percent, from about 30 to about 75 weight percent, from about 30 to about 70 weight percent, from about 30 to about 65 weight percent, from about 30 to about 60 weight percent, from about 30 to about 55 weight percent, from about 30 to about 50 weight percent, from about 30 to about 45 weight percent, from about 30 to about 40 weight percent, from about 30 to about 35 weight percent, from about 40 to about 98 weight percent, from about 40 to about 95 weight percent, from about 40 to about 90 weight percent, from about 40 to about 85 weight percent, from about 40 to about 80 weight percent, from about 40 to about 75 weight percent, from about 40 to about 70 weight percent, from about 40 to about 65 weight percent, from about 40 to about 60 weight percent, from about 40 to about 55 weight percent, from about 40 to about 50 weight percent, from about 40 to about 45 weight percent, from about 50 to about 98 weight percent, from about 50 to about 95 weight percent, from about 50 to about 90 weight percent, from about 50 to about 85 weight percent, from about 50 to about 80 weight percent, from about 50 to about 75 weight percent, from about 50 to about 70 weight percent, from about 50 to about 65 weight percent, from about 50 to about 60 weight percent, from about 50 to about 55 weight percent, from about 60 to about 98 weight percent, from about 60 to about 95 weight percent, from about 60 to about 90 weight percent, from about 60 to about 85 weight percent, from about 60 to about 80 weight percent, from about 60 to about 75 weight percent, from about 60 to about 70 weight percent, from about 60 to about 65 weight percent, from about 70 to about 98 weight percent, from about 70 to about 95 weight percent, from about 70 to about 90 weight percent, from about 70 to about 85 weight percent, from about 70 to about 80 weight percent, from about 70 to about 75 weight percent, from about 80 to about 98 weight percent, from about 80 to about 95 weight percent, from about 80 to about 90 weight percent, from about 80 to about 85 weight percent, from about 90 to about 98 weight percent, from about 90 to about 95 weight percent, or from about 95 to about 98 weight percent. In certain embodiments, the cured coating comprises ceramic particulate material in an amount of about 30 weight percent, about 35 weight percent, about 40 weight percent, about 45 weight percent, about 50 weight percent, about 55 weight percent, about 60 weight percent, about 65 weight percent, about 70 weight percent, about 75 weight percent, about 80 weight percent, about 85 weight percent, about 90 weight percent, about 95 weight percent, about 96 weight percent, about 97 weight percent, or about 98 weight percent.

In some embodiments, other solids may also be added to the ceramic particles in amounts of about 20 to about 95 weight percent based on the total weight of the cured coating to enhance lithium battery performance. In other embodiments, other solids may also be added to the ceramic particles in amounts of about 25 to about 95 weight percent, about 30 to about 95 weight percent, about 35 to about 95 weight percent, about 40 to about 95 weight percent, about 45 to about 95 weight percent, about 50 to about 95 weight percent, about 55 to about 95 weight percent, about 60 to about 95 weight percent, about 65 to about 95 weight percent, about 70 to about 95 weight percent, about 75 to about 95 weight percent, about 80 to about 95 weight percent, about 85 to about 95 weight percent, about 90 to about 95 weight percent, about 20 to about 30 weight percent, about 20 to about 40 weight percent, about 20 to about 50 weight percent, about 20 to about 60 weight percent, about 20 to about 70 weight percent, about 20 to about 80 weight percent, or about 20 to about 90 weight percent.

Examples of other solids usable in various embodiments include, but are not limited to, silicon or lithium doped ceramic oxides. In some embodiments, the cured coating may include one other solid (e.g., a silicon doped ceramic oxide or a lithium doped ceramic oxide, etc.). In other embodiments, the cured coating may include combinations of two or more types of other solids, including combinations of any two or more (e.g., a silicon doped ceramic oxide and a lithium doped ceramic oxide, etc.), three or more, four or more, five or more, etc. of the types of other solids described herein.

In certain embodiments, ceramic particles are mixed with a curable binder composition comprised of specific monomers and oligomers, which serve as precursors for the final crosslinked polymer binder, as well as photoinitiators, dispersants, adhesion promoters, wetting agents, or combinations thereof. Coated particles (e.g., silane-coated particles)

may be utilized in various embodiments to enhance adhesion between the cured binder composition and the ceramic particle.

According to various embodiments, the UV or EB curable binder mixture can be selected from three generic classes: 1) UV-curable water-based, 2) UV-curable epoxy comprised of UV-curable silicone or UV-curable epoxy, and 3) UV-curable (meth)acrylates (e.g., acrylated urethanes, polyesters, rubbers, and thioesters), where "(meth)acrylates" refers to methacrylates, acrylates, acrylamides, acryloyl morpholines, vinyl esters, and combinations thereof.

Examples of curable binder mixture components usable in various embodiments include, but are not limited to, an acrylated water-based resin blend, cycloaliphatic epoxy terminated oligomers and monomers and a cationic photoinitiator, acrylated terminated oligomers and monomers and a free-radical initiator, acrylated polyurethane, acrylated rubber, acrylated monomer and combinations thereof. The curable binder mixture of various embodiments includes at least one type of precursor component. In certain embodiments, the curable binder mixture includes one type of precursor component (e.g., one type of UV-curable water-based urethane, one type of acrylated polyurethane, one type of acrylated monomer, one type of acrylated rubber, one type of cycloaliphatic epoxy oligomer, one type of acrylic resin, one type of cycloaliphatic epoxy silicone, one type of polyester acrylate, one type of melamine acrylate, one type of aliphatic urethane acrylate, etc.). In other embodiments, the curable binder mixture may include combinations of two or more types of precursor components, including combinations of any two or more (e.g., cycloaliphatic epoxy terminated oligomers and monomers; acrylated monomer and acrylated rubber; acrylated terminated oligomers and monomers; etc.), three or more (e.g., polyester acrylate, aliphatic urethane acrylate, and acrylic resin; melamine acrylate, aliphatic urethane acrylate, and acrylic resin; etc.), four or more, five or more, etc. of the types of precursor components described herein. Mixtures of precursor ingredients can be used to optimize coating properties, such as flexibility, toughness, elongation, particle adhesion, separator adhesion, porosity, and ionic conductivity. One non-limiting example of precursors that benefit from mixtures of such is acrylated ingredients.

According to certain embodiments, the UV or EB cured coating may comprise rubber polymers (e.g., polyisoprene-based rubbers, polybutadiene-based rubbers, etc.). Examples of curable binder mixture components useful in the production of a rubber polymer-based UV or EB cured coating include, but are not limited to, isoprene, butadiene, cyclopentadiene, ethylidene norbornene, vinyl norbornene, and combinations thereof. In some embodiments, the curable binder mixture components may be functionalized to include reactive groups (e.g., carboxylate, acrylate, vinyl, vinyl ether, or epoxy groups) that enhance ceramic particle adhesion and/or improve UV or EB induced crosslinking.

The rubber polymer is not limited to any particular polymeric backbone. In one or more embodiments, the UV or EB cured coating may comprise a rubber polymer having an isoprene backbone with one or more reactive functional groups. Illustrative rubber polymer backbones include, but are not limited to, a carboxylated methacrylated isoprene backbone, a carboxylated methacrylated butadiene backbone, a butadiene backbone, and combinations thereof. In certain embodiments, the UV or EB cured coating may comprise multiple different polymeric backbone segments (e.g., isoprene-butadiene copolymers).

In one or more embodiments, cycloaliphatic epoxy terminated oligomers and monomers and a cationic photoinitiator are included in the resin mixture. This mixture is mixed with non-basic ceramic sand, applied to a separator, and UV or EB cured on the separator. The cycloaliphatic epoxy terminal group can be on virtually any polymeric backbone. In certain embodiments, the polymeric backbone is a hydrocarbon or silicone backbone. Mixtures of cycloaliphatic epoxy ingredients also can be selected to optimize coating properties, such as flexibility, toughness, elongation, particle adhesion, separator adhesion, and ionic conductivity.

In some embodiments, an acrylated water based resin blend is mixed with ceramic particles, applied to a separator, and UV or EB cured on the separator.

In other embodiments, acrylated terminated oligomers and monomers and free-radical initiators are included in the resin mixture. This resin mixture is mixed with ceramics, applied to a separator, and UV or EB cured on the separator. In certain embodiments, the acrylated composition is EB cured and thus, the photoinitiator is unnecessary and should not be included in the formulation.

The acrylated terminal group can be on virtually any polymeric backbone. In certain embodiments, the polymeric backbone can resist hot electrolyte and not react with ions (e.g., lithium ions). Illustrative backbones include, but are not limited to, rubbers, silicones, thioesters, acrylics, styrene acrylics, urethanes, fluorinated hydrocarbons, hydrocarbons, and polyesters.

In certain embodiments, polyvinylidene fluoride (PVDF) binder is not used. PVDF requires dissolution in N-methyl-2-pyrrolidone (NMP), a dangerous solvent. When used, NMP must be captured and recycled in certain situations, as it is too dangerous for workers to breath and a hazardous pollutant that cannot be exhausted into the environment.

Further, various embodiments do not primarily utilize thermoplastic binder to hold ceramic particles in place. When the melt point of the thermoplastic is reached, the ceramic particles would be free to move. In contrast, the ceramic particles of various present embodiments lacking thermoplastic binder remain adhered to both the polymer of the UV or EB cured coating and to the separator.

As discussed above, additional ingredients may be mixed with the curable binder composition in various embodiments. Illustrative additional ingredients usable in the coatings of various embodiments include, but are not limited to, reactive diluents, dispersing agents, wetting agents, dark cure additives, alternative photoinitiators, co-initiators, solvents, blowing agents, crosslinkers, and combinations thereof. Non-limiting examples of such additives are detailed in the Examples herein. In some embodiments, the coating may include one type of additional ingredient (e.g., one dispersing agent, wetting agent, dark cure additive, alternative photoinitiator, co-initiator, solvent, or blowing agent, etc.). In other embodiments, the coating may include combinations of two or more types of additional ingredients, including combinations of any two or more (e.g., dispersing agent and cationic photoinitiator; dispersing agent and solvent; photoinitiator and solvent; etc.), three or more (dispersing agent, photoinitiator and defoamer; dispersing agent, pH adjuster and crosslinker; dispersing agent, photoinitiator and solvent; etc.), four or more (dispersing agent, photoinitiator, co-initiator and solvent; etc.), five or more (dispersing agent, photoinitiator, co-initiator, pH adjuster and solvent; etc.), etc. of the types of additional ingredients described herein. Most of these are minor ingredients and are likely to be in the range from about 0 to about 10% by weight, from about 0 to about 5% by weight, or from about 0 to about 2% by weight. In some embodiments, the slurry does not comprise a photoinitiator.

Illustrative reactive diluents useful as additional ingredients include, but are not limited to, isobornyl acrylate, polyethylene glycol diacrylate, hexanediol diacrylate, alkyoxylatedhexanedioldiacrylate, and combinations thereof. Examples of crosslinkers useful as additional ingredients include, but are not limited to, monofunctional acrylates, difunctional acrylates, multifunctional acrylates, other vinyl compounds, and combinations thereof. If used, acrylates may be linear, branched (e.g., 2-ethylhexyl acrylate, isostearyl acrylate, etc.), cyclic (e.g., dicyclopentanyl acrylate, n-vinyl caprolactam, etc.), or aromatic (e.g., phenoxyethylacrylate). Illustrative Bifunctional and multifunctional acrylates include, but are not limited to, 1,6-hexandiodi(meth)acrylate, 1,9-hexandiodi(meth)acrylate, tricyclodecanedimethanol diacrylate, and combinations thereof.

Illustrative photoinitiators useful as additional ingredients include, but are not limited to, benzophenone, hydroxyacetophenone, methylbenzophenone, 4-Phenylbenzophenone, 4,4'-Bis(diethyl amino)benzophenone, Michler's Ketone, 4-(2-hydroxyethoxy)phenyl-(2-hydroxy-2-methylpropyl) ketone, other benzophenone derivatives, benzyldimethyl ketal, 2-benzyl-2-N,N-dimethylamino-1-(4-morpholinophenyl)-1butanone, 2-mercaptobenzoxazole, camphorquinone, 2-hydroxy-2-methyl-1-(4-t-butyl)phenylpropan-1-none, 2-methyl-1-[4-(methylthiophenyl)-2-morpholinopropane, maleimides, 2,4,5-trimethylbenzoyl-diphenyl phosphine oxides, bis(2,6-dimethyloxybenzoyl) 2,4,4-trimethylpentyl) phosphine oxide, bis(2,4,6-trimethylbenzoyl)-phenylphosphineoxide, propanone photoinitiators (e.g., oligo(2-hydroxy-2-methyl-1-[4-(1-methylvinyl)phenyl]propanone, 2-hydroxy-2-methyl-1-phenylpropan-1-one, and combinations thereof), oxide photoinitiators (e.g., bis(2,4,6-trimethylbenzoyl)), polymeric photoinitiators derived from the above photoinitiators, and combinations thereof.

Examples of wetting agents useful as additional ingredients include, but are not limited to, acetone, isopropyl alcohol, dimethyl carbonate, and combinations thereof.

Still further embodiments are directed to a coated separator comprising a separator; and any of the UV or EB cured coatings discussed above adhered to at least one surface of the separator. For instance, certain embodiments are directed to a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating.

Other embodiments are directed to an electrochemical device having a coated separator comprising a separator; and any of the UV or EB cured coatings discussed above adhered to at least one surface of the separator. For instance, certain embodiments are directed to an electrochemical device having a coated separator comprising a separator; and a UV or EB cured coating adhered to at least one surface of the separator, said UV or EB cured coating comprising: a polymeric material including a UV or EB cured matrix comprising a crosslink reaction product from one or more precursors selected from one or more monomers, one or more oligomers, or combinations thereof; and a ceramic particulate material. The ceramic particulate material may be present in the cured coating in an amount of from about 30 to about 98 weight percent based on the total weight of the cured coating. In certain embodiments, the ceramic particulate material may be present in the cured coating in an amount of from about 40 to about 95 weight percent based on the total weight of the cured coating. Other embodiments are directed to a method of making a coated separator or an electrochemical device incorporating a coated separator, said method comprising: mixing a ceramic particulate material with a curable binder mixture comprising one or more monomers, one or more oligomers, or a combination thereof to form a slurry; applying the slurry to at least one surface of a separator to form a slurry coated separator; and subjecting the slurry coated separator to UV or EB radiation, thereby curing the curable binder mixture and forming a UV or EB cured matrix. The UV or EB cured matrix adheres to at least one surface of the separator and the ceramic particulate material is distributed throughout the UV or EB cured matrix.

Figure 2:
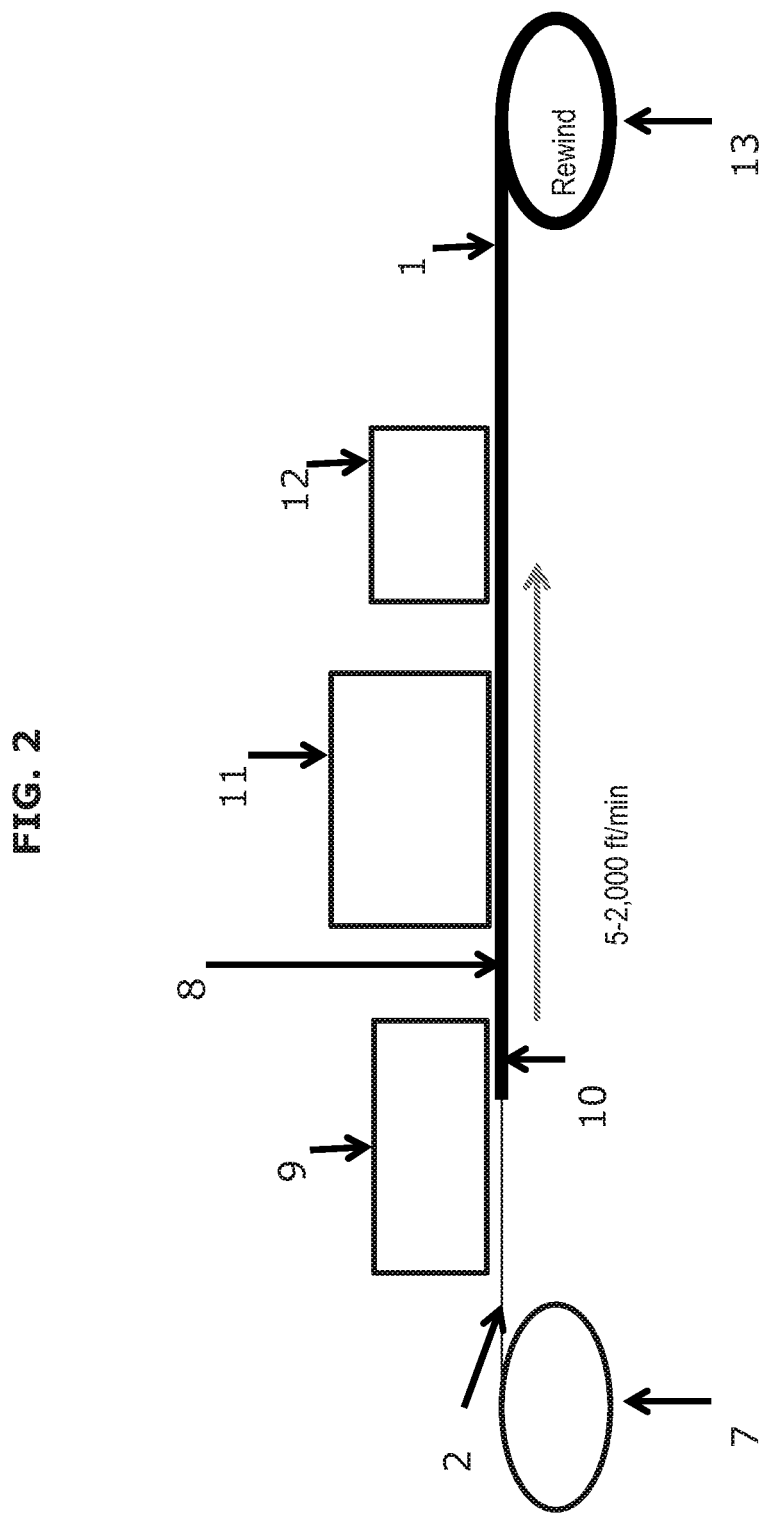
FIG. 2 is a schematic illustrating a system for coating a separator according to one or more embodiments.

FIG. 2 illustrates a system on which the slurry application and curing process steps may be performed, with the porous separator film 2 being unwound from a first spool 7, coated with the slurry 8 using a liquid coater 9, passing the slurry coated film separator 10 under an optional blower/heater 11 to remove solvent (not shown), and then passing the slurry coated film separator 10 under a UV or EB source 12 (e.g., lamp(s)) to cure the slurry 8. The coated separator 1 may then optionally be wound on a second spool 13. In certain embodiments, the system does not have and/or utilize the optional blower/heater 11.

Figure 3:
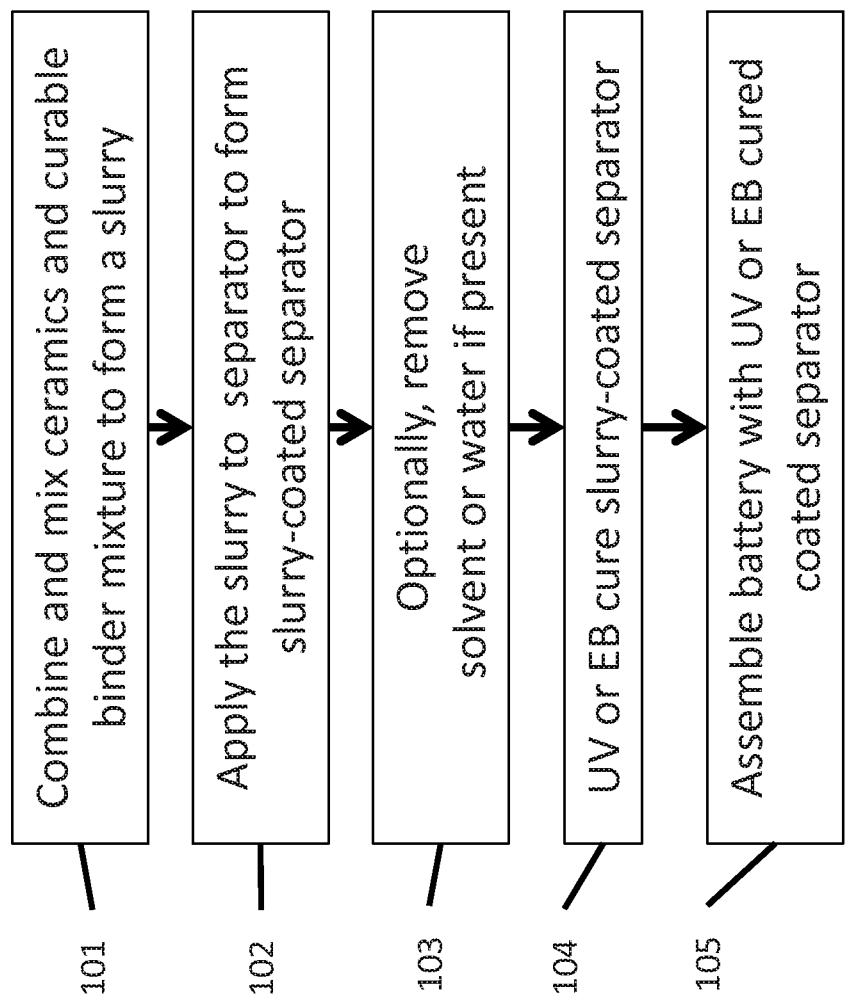
FIG. 3 is a flowchart illustrating steps for producing a battery having a coated separator according to one or more embodiments.

A method of making a coated separator according to certain embodiments is shown in FIG. 3. Said method comprises: combining and mixing a ceramic particulate material with a curable binder mixture comprising at least one selected from the group consisting of monomers, oligomers and combinations thereof to form a slurry (step 101); applying the slurry to at least one surface of a separator to form a slurry coated separator (step 102); and subjecting the slurry coated separator to UV or EB radiation (step 104), thereby curing the curable binder mixture. The process may optionally include adding a solvent in step 101 to, for example, control consistency of the slurry. In the event a solvent is added in step 101, the process may optionally include removing the solvent in optional step 103 before the slurry is cured in step 104. The process may also include a step 105 of assembling a battery with the coated separator. The battery may include, for example, an anode, cathode, electrolyte and the coated separator. The illustrative process illustrated in FIG. 3 need not include every step, and the steps may be performed individually without performing the other steps.

According to various embodiments, conventional mixing technology may be used to prepare the slurry of the UV or EB curable binder components and the ceramic particles. The slurry is then coated on the separator and cured using either UV actinic radiation or EB radiation. In various embodiments, the coating thickness of the slurry is nominally less than 10 µm and usually less than 4 µm. In certain embodiments, a minimum slurry coating thickness is 0.1-0.3 µm. In one or more embodiments, this minimum coating thickness is achieved using an offset press. One or both sides of the separator are normally coated and the coatings UV or EB cured. UV curing refers to the spectrum from 200-500 nm. Although 400-460 nm is technically in the purple-blue visible, UV lamps emit considerable energy in this region too, and well chosen "UV" photoinitiators absorb light at these frequencies. The UV-Visible photoinitiators are especially well suited to this application as these long wave lengths are more capable of penetrating deeper into the liquid coating. This is extremely critical in some of the various embodiments because many of the thermally conductive particles are white and are very efficient at blocking UV light. For these applications, it is usually best to use lamps with output maximum in the UVC and visible ranges. A mixture of photoinitiators is typically used to take advantage of any light that penetrates into the coating past the particles.

Water or solvent may also be added to the UV or EB curable binder composition to, for example, increase the porosity of the cured coating or to adjust the flow and rheology of the liquid coating to make it suited to different application methods. Examples of different slurry application methods include, but are not limited to: curtain coating, roll, gravure, flexographic, screen, rotary screen, letterpress, offset, slot die, and any other printing method suitable for coating film. If water or solvents are added to the binder, then they may be removed in some embodiments from the coating before UV or EB curing. Some of the suitable solvents are those that have low toxicity, have minimal regulation, evaporate quickly and do not have a high affinity for the coating ingredients or the particles in the slurry. Various solvents are available and may be used in various embodiments. Examples of solvents usable in various embodiments include, but are not limited to, glycol ether and alcohols (e.g., isopropyl alcohol). As discussed above, the solvent does not include NMP in certain embodiments. Forgoing the use of NMP eliminates the necessity of solvent capture and recycle, and thus, any cost and time associated with such processes.

Water or solvent, if utilized, may be present in the slurry in amounts of up to about 70%. In some embodiments, the solvent is present in the slurry in an amount between about 15 and 20%, between about 10 and 20%, or between about 5 and 20%. In certain embodiments, the solvent is present in the slurry in an amount less than about 20%, less than about 15%, less than about 10%, or less than about 5%. Amounts of solvent or water less than about 20% allow rapid evaporation.

In various embodiments, the separator includes a top surface and a bottom surface, and applying the slurry to at least one surface of the separator to form a slurry coated separator comprises applying the slurry to the top surface or the bottom surface, but not to both the top surface and the bottom surface. In other embodiments, applying the slurry to at least one surface of the separator to form a slurry coated separator comprises applying the slurry to both the top surface and the bottom surface. The slurry may be applied to the separator in a continuous coat, a pattern, or a combination thereof, and may completely or partially cover the top surface of the separator, bottom surface of the separator, or a combination thereof. In some embodiments, the slurry is applied as a continuous coat to the top surface and as a continuous coat to the bottom surface. In other embodiments, the slurry is applied as a pattern to the top surface and in a pattern to the bottom surface. In still other embodiments, the slurry is applied as a pattern to the top surface and as a continuous coat to the bottom surface. In further embodiments, the slurry is applied as a pattern to the bottom surface and as a continuous coat to the top surface.

In some embodiments, the resulting slurry is applied on the polymeric separator as a continuous coat. Illustrative application methods that can be used to apply this liquid slurry include, but are not limited to: roll coat, screen, curtain, gravure, reverse gravure, slot die, flexographic, letterpress, offset, and a combination thereof. In some embodiments, there is a brief drying period (e.g., air or hot air across the web) to drive the water or solvent off and produce a porous liquid coating. The slurry is then exposed to UV actinic radiation or EB radiation to polymerize the resin and bind the ceramic particles to each other and to the separator. In one or more embodiments, a chilled roll is used during the UV or EB curing exposure. One or both sides of the separator can be coated with this continuous coat process.

In various embodiments, the resulting slurry is printed on the separator in a pattern. Examples of application methods that can be used to apply this liquid slurry in a printed pattern include, but are not limited to: screen, curtain coat, gravure, reverse gravure, flexographic, letterpress, offset, and a combination thereof. Different printing methods are used to achieve coatings of different thickness and resolutions. The order of printing techniques listed is from thickest to thinnest as well as from coarsest to fineness of resolution. Printed patterns may require less airflow and drying as more surface is exposed. After application, the slurry is then exposed to UV actinic radiation or EB radiation to polymerize the resin and bind the ceramic particles to each other and to the separator. In one or more embodiments, a chilled roll is used during the UV or EB curing exposure. One or both sides of the separator can be coated with this pattern print process.

In certain embodiments, the slurry comprises UV water-based matrix components and is printed on the separator in a pattern using flexographic printing. In other embodiments, the slurry comprises urethane and/or rubber matrix components and is printed on the separator in a pattern using offset printing. According to some embodiments, the slurry comprises water-based matrix components and is printed on the separator in a pattern using an application method other than offset printing.

Prior art methods do not teach or utilize patterned cured separator coatings as set forth in the present disclosure. Applying the slurry to the separator in a pattern has many advantages. For instance, patterning the slurry allows for the use of less slurry (e.g., less binder and ceramic particulate material) and thus, a reduction in material costs. In some embodiments, the amount of binder used in the case of pattern coating is two times less than that used in the case of continuous coating. While providing the same safety benefits as a continuous coating, a pattern coating allows for improved coated separator porosity and increased slurry application rate, as compared to a continuous coating.

The separator of various embodiments is not particularly limited with regard to type, composition or form. However, the separator may be limited with regard to function. For example, in certain embodiments, the separator must at least be capable of serving as an electrical barrier between the cathode and the anode of an electrochemical device (e.g., a battery), while allowing ions (e.g., lithium ions) to flow through pores of the separator. In other words, when used in an electrochemical device (e.g., a battery), the separator must be an electrical barrier, but not an ionic barrier. A variety of separators are commercially available and suitable in various embodiments. In certain embodiments, the separator has a shut-down mechanism. For example, the separator may be comprised of thermoplastic polymers that flow when exposed to heat. This heat-induced polymer flow causes pores in the separator to close, and thus, the separator becomes a barrier to ionic flow. Hence, in the event of mild or gradual overheating, the thermoplastic separator shuts the battery down. In some embodiments, the separator is configured to shut-down at a particular temperature. For example, in certain embodiments, the separator is configured to shut-down in response to being heated to a temperature of 100° C. or higher. In other embodiments, the separator is configured to shut-down in response to being heated to a temperature of 105° C. or higher, 110° C. or higher, 115° C. or higher, 120° C. or higher, 125° C. or higher, 130° C. or higher, 135° C. or higher, 140° C. or higher, 145° C. or higher, 150° C. or higher, 155° C. or higher, 160° C. or higher, 165° C. or higher, 170° C. or higher, 175° C. or higher, 180° C. or higher, 185° C. or higher, 190° C. or higher, 195° C. or higher, or 200° C. or higher. In various embodiments, the upper shut-down temperature limit is the flammability of the particular electrolyte used or the battery casing. In certain embodiments, the separator is configured to shut-down in response to being heated to a temperature from 100° C. to 200° C., from 110° C. to 200° C., from 120° C. to 200° C., from 100° C. to 140° C., from 110° C. to 140° C., or from 120° C. to 140° C. In other embodiments, the separator is configured to shut-down in response to being heated to a temperature of 100° C., 105° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., or 200° C. The shut-down temperature, according to various embodiments, depends on the particular polymer(s) used to make the separator. For example, the shut-down temperature of trilayer separators is often determined by the melting temperature of the center layer (e.g., polyethylene).

Examples of separators usable in various embodiments include, but are not limited to, polymeric membranes or film comprising polyethylene (PE), polypropylene (PP) or combinations thereof (e.g., coextruded blends of PE and PP). In some embodiments, the separator may have a single layer (e.g., a single polymeric film). In other embodiments, the separator may include two or more layers, including two or more, three or more, four or more, five or more, etc. layers. In certain embodiments, the separator is a trilayer separator. A non-limiting example of a trilayer separator is a PP\PE\PP trilayer separator.

The uncoated separator may have a thickness between about 5 and about 25 μm. In certain embodiments, the thickness of the uncoated separator is between about 5 and about 20 μm, between about 10 and about 20 μm, between about 15 and about 20 μm, between about 10 and about 25 μm, or between about 15 and about 25 μm.

The cured coating of various embodiments includes at least one type of curable binder mixture. In some embodiments, the cured coating may include combinations of two or more types of curable binder mixtures, including combinations of any two or more, three or more, four or more, five or more, etc. of the types of curable binder mixtures described herein.

In cases where no light can penetrate to the base of the coating, then electron beam curing can be used. High energy electrons (75-300 kV) with a dosage of about 10 to about 40 kGy can penetrate the liquid slurry and cure the coating all the way to the separator (e.g., polyolefin film or trilayer separator).

In certain embodiments, curing may be carried out at a speed between about 5 and about 2000 ft/min. at room temperature. An inert environment may be necessary, in some embodiments, if EB is used. However, in various embodiments using UV curing, an inert environment is not required.

In various embodiments, radiation dosages between about 1 and about 100 kGy are suitable. In certain embodiments, lamps may be powered between about 50 and about 1000 W/in.

According to various embodiments, the UV or EB cured coating is adhered to the top surface or the bottom surface of the separator, but not to both the top surface and the bottom surface. In other embodiments, the UV or EB cured coating is adhered to both the top surface and the bottom surface of the separator. The UV or EB cured coating may be present on the separator as a continuous coat, a pattern, or a combination thereof, and may completely or partially cover the top surface of the separator, bottom surface of the separator, or a combination thereof. According to various embodiments, the coated separator suppresses ionic flow through pores of the separator and remains electrically insulating in response to being heated to a temperature of 100° C. or higher (e.g., 100° C., 105° C., 110° C., 115° C., 120° C., 125° C., 130° C., 135° C., 140° C., 145° C., 150° C., etc.). In further embodiments, the ceramic particulate material remains bound to the UV or EB cured matrix and to the separator, and the coated separator maintains its shape while heated to a temperature of 100° C. or higher (e.g., 100° C., 105° C., 110° C., 115° C., 120° C., 125° C., 130° C., 135° C., 140° C., 145° C., 150° C., etc.).

According to various embodiments, the UV or EB cured matrix is nonionic. In certain embodiments, the ceramic particulate material is bound to the UV or EB cured matrix, bound to the separator by the UV or EB cured matrix, and distributed uniformly throughout the UV or EB cured matrix. This is distinct from prior art methods using ionic materials, such as ionic polymer layers, which form channels/portals. The ionic polymer layers themselves aid in ion transport and do not have a binding function. If anything, such ionic materials of the prior art bind the polymers to themselves. Charge and discharge rates of batteries using such separators of the prior art are limited because ions have to travel on the polymer.

Certain embodiments do not require the use of UV or EB curing. For example, the precursor mixture may comprise a water-based acrylic, water-based urethane, or combination thereof which is cured by a method other than UV or EB curing. Such embodiments are useful in the case where the press does not have the equipment for UV or EB curing. However, in one or more embodiments which do not use UV or EB curing, in order to obtain the chemical resistance to withstand the harsh electrolyte and lithium ion environment, a cross-linking agent is necessary. Examples of common cross-linking agents for this type of chemistry include, but are not limited to, (poly)aziridine(s), metal driers, and peroxides. Beyond the method not including UV or EB curing, certain embodiments which do not use UV or EB curing are not limited to any particular curing method. A non-limiting example of a curing method suitable in various embodiments which do not use UV or EB curing is forced-air curing.

The slurry of the embodiments utilizing a curing method other than UV or EB curing may comprise the same type and amounts of ceramic particulate material as that of the UV or EB curing embodiments. These slurries may also be applied to the separator in a continuous coat, a pattern, or a combination thereof, and may completely or partially cover the top surface of the separator, bottom surface of the separator, or a combination thereof. In various embodiments, the slurry is applied to the separator in a printed pattern with a screen, curtain coat, gravure, reverse gravure, flexographic printer, letterpress, offset press, or a combination thereof. As discussed above, prior art methods do not teach or utilize patterned cured separator coatings as set forth in the present disclosure. According to some embodiments, the cured coating is adhered to the top surface or the bottom surface of the separator, but not to both the top surface and the bottom surface. In other embodiments, the cured coating is adhered to both the top surface and the bottom surface of the separator.

According to various embodiments, UV or EB curing patterned separator coatings allows for a sharper, more defined pattern than curing patterned separator coatings via a curing method other than UV or EB curing. In certain embodiments, the sharper, more defined pattern obtained via UV or EB curing patterned separator coatings results in improved separator performance, as compared to that of patterned separator coatings cured via a method other than UV or EB curing.

One of the great disadvantages of prior art technology is the separator coating process. Such prior art coating process utilizes a PVDF binder and is extremely slow. It is much slower than the co-extrusion and biaxial orientation processes used to make the separator. Hence, the coating process becomes an off-line process. In fact, the solvent evaporation process of the prior art requires multiple lines (each longer than a football field) to keep up with each extruder. This is an extremely capital intensive process that requires a lot of people, equipment, and real estate to operate. Because the binder of various present embodiments cures instantly, various present embodiments overcome some of the time and economic constraints of other separator coating methods. Previous coating methods required a drying oven with an associated drying time. The faster the coating/drying, the longer the oven must be and therefore the larger the capital cost.

According to various embodiments, the cured coating may have a thickness between about 0.1 and about 10 µm. In certain embodiments, the thickness of the cured coating is between about 2 and about 3 µm, between about 2 and about 3 µm, between about 2 and about 4 µm, between about 2 and about 5 µm, between about 2 and about 6 µm, between about 2 and about 7 µm, between about 2 and about 8 µm, between about 2 and about 9 µm. In some embodiments, the thickness of the cured coating is about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 3 µm, about 4 µm, about 5 µm, about 6 µm, about 7 µm, about 8 µm, about 9 µm, or about 10 µm. The cured coating may comprise more than one layer of coating, and each layer does not necessarily need to be the same. In some embodiments, the coated separator may include two or more layers of coating, including two or more, three or more, four or more, five or more, etc. layers of any of the coatings described herein. When multiple coating layers are applied, each layer does not necessarily have to be of the same thickness, composition, or form (e.g. patterned or continuous).

According to various embodiments, the cured coated separator may have a thickness between about 6 and about 30 µm. In certain embodiments, the cured coated separator may have a thickness between about 6 and about 7 µm, between about 6 and about 8 µm, between about 6 and about 9 µm, between about 6 and about 10 µm, between about 6 and about 15 µm, between about 6 and about 20 µm, between about 6 and about 25 µm, between about 10 and about 30 µm, between about 15 and about 30 µm, between about 20 and about 30 µm, between about 25 and about 30 µm, between about 10 and about 15 µm, between about 10 and about 20 µm, between about 10 and about 25 µm. In some embodiments, the thickness of the cured coating is about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 21 µm, about 22 µm, about 23 µm, about 24 µm, about 25 µm, about 26 µm, about 27 µm, about 28 µm, about 29 µm, or about 30 µm.

Various examples are set forth below. Each example is provided by way of explanation, not limitation of the disclosure. It will be apparent to those skilled in the art that various modifications and variations may be made without departing from the scope or spirit of the disclosure. For instance, features illustrated or described as part of one example, may be used in another example. Thus, it is intended that the disclosure cover such modifications and variations.

EXAMPLES

Example 1: Water-Based, UV-Curable, Aluminum Oxide-Filled Coatings on a Separator A water-based UV-curable binder composition was prepared and mixed with aluminum oxide powder in the proportions shown below in Table 1 to form a slurry.

TABLE 1

UV-curable, water-based binder with aluminum oxide powder

| Ingredient | Manufacturer | Chemical Description | Weight % |
| --- | --- | --- | --- |
| Ucecoat 7689 | Cytec | Acrylated polyurethane dispersion mixture | 16 |
| Ucecoat 7699 | Cytec | Acrylated polyurethane dispersion mixture | 16 |
| Tego 750W | Evonik | Modified polymer dispersant | 2.2 |
| 9038-95-3 | Altana | polysiloxane defoamer | 0.2 |
| Glycol ether | Dow Chemical | Solvent | 2 |
| N-methyldiethanolamine | BASF | co-initiator | 0.8 |
| Irgacure 500 | BASF | Photoinitiator | 1.9 |
| Irgacure 819-dw | BASF | Photoinitiator | 0.9 |
| 26R-020212UP2 | Advanced Materials, LLC | Aluminum Oxide Power, 0.5-1 µm | 60 |
| | | total | 100 |

The resulting slurry from Table 1 was applied on a 25-µm microporous PP\PE\PP trilayer separator film designed for use in lithium ion batteries (CELGARD 2325). Single or double sided coatings were made to the various sample separators. As seen in Table 2, a coating was made to a single side of the trilayer separator of Samples 1 and 3. In contrast, the trilayer separators of Samples 2 and 4 were coated on both sides (e.g., double sided coatings). In addition, the coatings applied to the separators were either continuous porous coatings or patterned coatings. As seen in Table 2, a continuous porous coating was made to the trilayer separator of Samples 3 and 4. In contrast, the trilayer separators of Samples 1 and 2 were pattern coated. As summarized in Table 2, the trilayer separator of Sample #1 was pattern coated on a single side with the coating of Table 1, the trilayer separator of Sample #2 was pattern coated on both sides with the coating of Table 1, the trilayer separator of Sample #3 was continuous coated on a single side with the coating of Table 1, and the trilayer separator of Sample #4 was continuous coated on both sides with the coating of Table 1.

The continuous coatings were applied with a #1 K bar rod using an RK Control Koater. The coatings were then cured on a Miltec MUVI conveyor with one single Miltec MPI-400 lamp equipped with a Miltec 380-0004 UV bulb at a conveyor speed of 150 feet per minute. Each resulting aluminum oxide-filled UV coating was 4-6 µm thick. For instance, the sample separators that were continuous coated on a single side had a resulting 4-6 µm thick aluminum oxide-filled UV coating on that single side, and the sample separators that were continuous coated on both sides had a resulting 4-6 µm thick aluminum oxide-filled UV coating per side.

The patterned coatings were achieved with a flexographic hand proofer from Pamarco. The positions of the anilox and the rubber roller were reversed such that the applied pattern was that of the anilox and not the smooth coating that might result from the rubber roller. A 200 line per inch (lpi) 5.3 bcm anilox was used. This resulted in a 2-4 µm-thick aluminum oxide filled UV coating. For instance, the sample separators that were pattern coated on a single side had a resulting 2-4 µm thick aluminum oxide-filled UV coating on that single side, and the sample separators that were pattern coated on both sides had a resulting 2-4 µm thick aluminum oxide-filled UV coating per side.

Both the ceramic coating resulting from continuous coating and the ceramic coating resulting from pattern coating appeared uniform, stable, and strongly adhered to the separator. Samples of coated and uncoated 25-µm microporous PP\PE\PP trilayer separator films were placed in an oven at 100° C. The uncoated sample curled and showed signs of partial melting, becoming clear in spots. The coated samples remained flat and with very little curl.

Figure 4B:
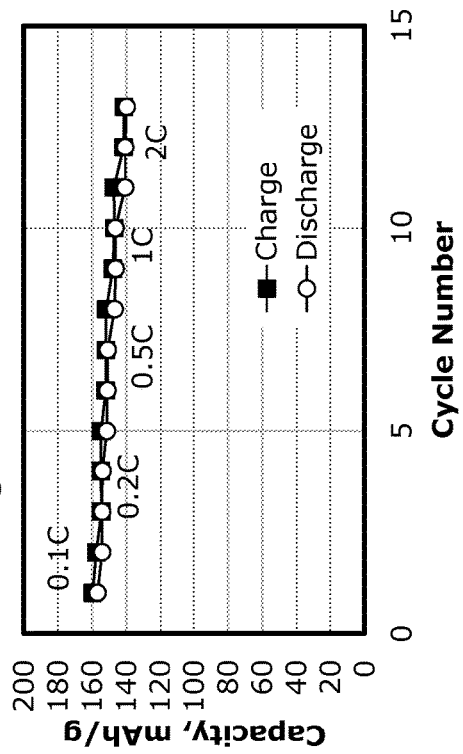
FIG. 4B illustrates the charge rate performance of an uncoated reference separator.
Figure 4C:
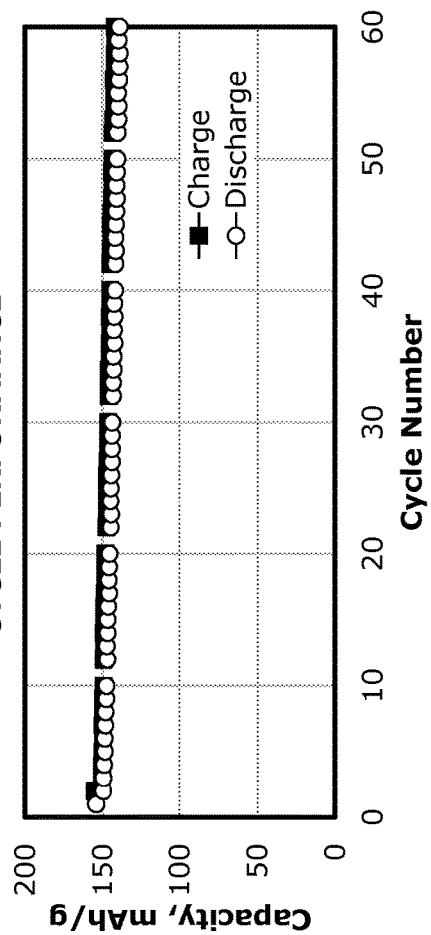
FIG. 4C illustrates the cycle performance of an uncoated reference separator.
Figure 4A:
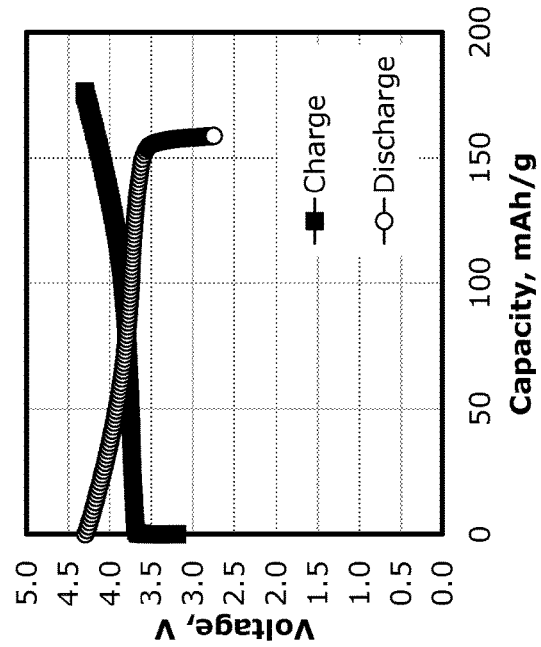
FIG. 4A illustrates the voltage profile of an uncoated reference separator.

An uncoated separator was assembled into an 18650 Lithium ion coin cell. The cathode was a standard 14 mg/cm$^2$ NMC coated aluminum. The anode was lithium metal. The cell was charged and discharged at a C/10 rate. FIGS. 4A, 4B and 4C illustrate the voltage profile (C/10), charge rate performance and cycle performance (C/5), respectively, of the uncoated reference separator.

The coated separator samples were assembled into an 18650 Lithium ion coin cell. The cathode was a standard 14 mg/cm$^2$ NMC coated aluminum. The anode was lithium metal. The cells were charged and discharged at a C/10 rate. FIGS. 5-8 illustrate the voltage profile of the coated sample separators. As shown in Table 2 and the voltage profiles (C/10) of FIGS. 4A and 5-8, the batteries utilizing the coated separators were capable of being charged and discharged and the charge and discharge capacities were similar to that of the control.

TABLE 2

Coin Cell Test Results, 25-um Microporous Trilayer PP/PE/PP Separator with and without UV-cured ceramic coatings

Figure 6:
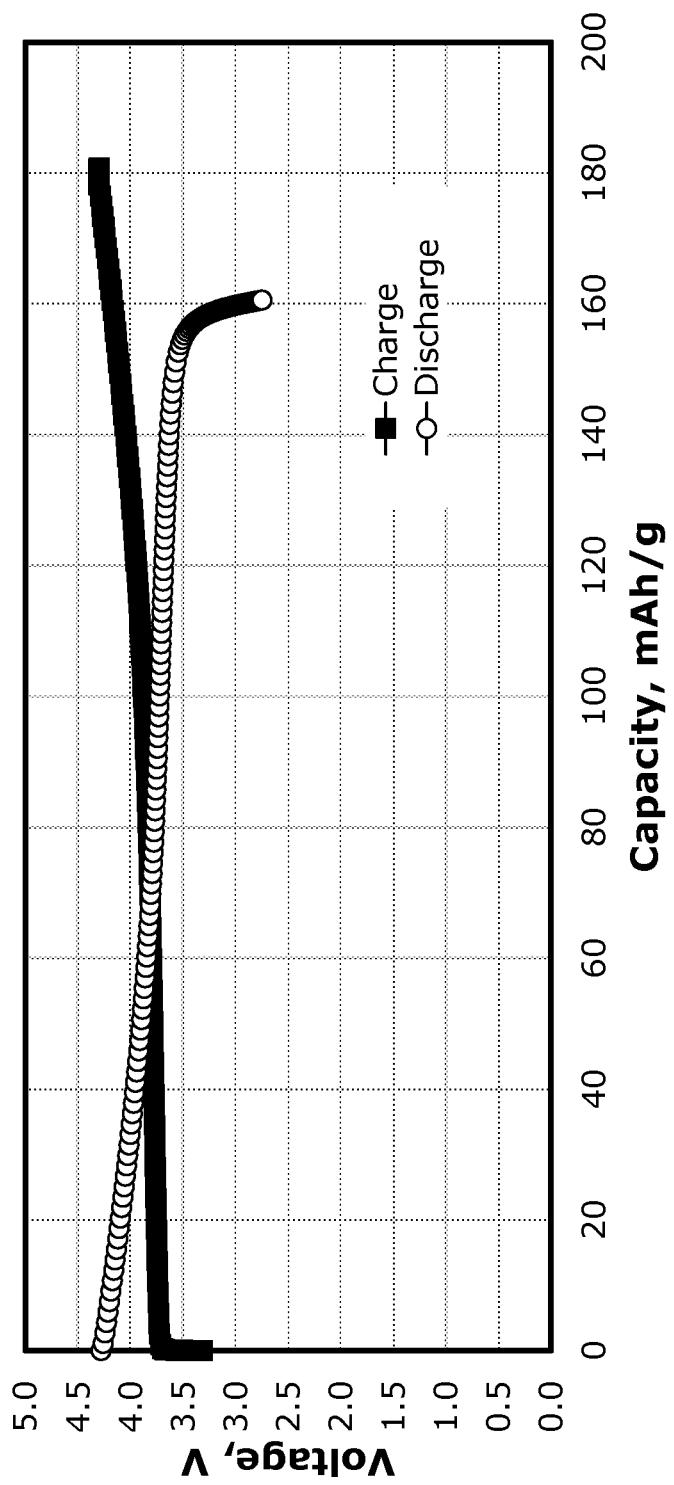
FIG. 6 illustrates the voltage profile of a coated separator according to one or more embodiments.
Figure 7:
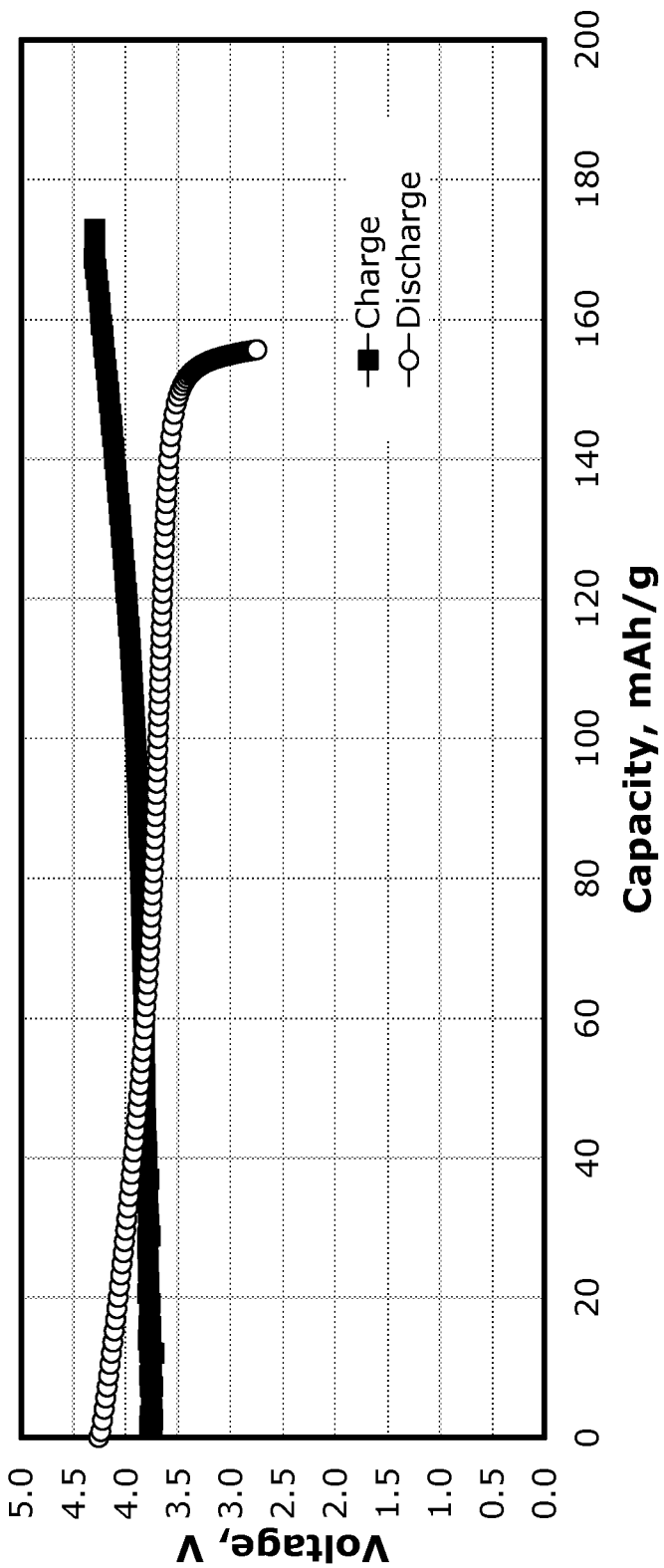
FIG. 7 illustrates the voltage profile of a coated separator according to one or more embodiments.
Figure 8:
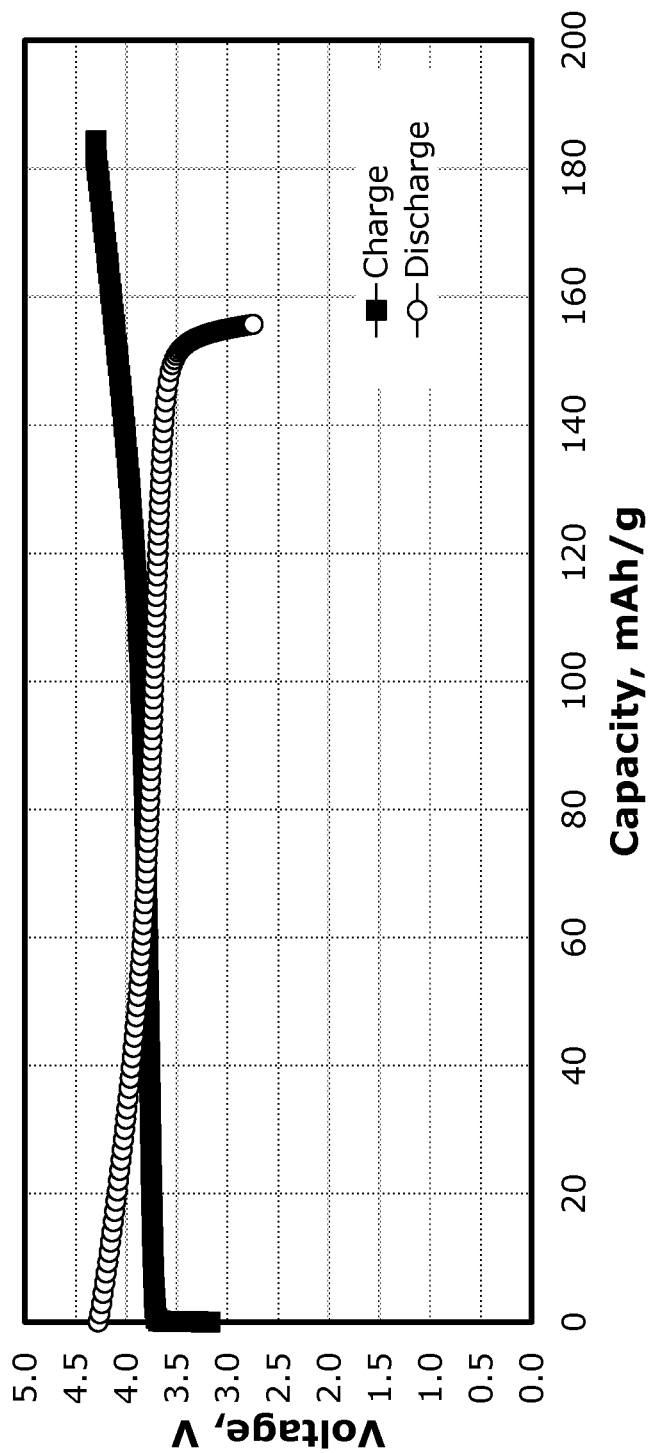
FIG. 8 illustrates the voltage profile of a coated separator according to one or more embodiments.

| Sample # | Condition | Voltage Profile | Charge, mAh | Discharge, mAh | Charge, mAh/g | Discharge mAh/g | AhEff, % |
|---|---|---|---|---|---|---|---|
| Control | Uncoated | FIG. 4A | 2.03 | 1.82 | 176 | 159 | 90 |
| 1 | Single sided pattern coated | FIG. 5 | 2.04 | 1.79 | 179 | 157 | 87 |
| 2 | Double sided pattern coated | FIG. 6 | 1.95 | 1.73 | 181 | 161 | 89 |
| 3 | Single sided continuous coated | FIG. 7 | 2.13 | 1.94 | 173 | 156 | 90 |
| 4 | Double sided continuous coated | FIG. 8 | 2.15 | 1.82 | 184 | 156 | 84 |

Another non-limiting example of a UV-curable water-based coating is set forth in Example 2.

Example 2: UV-Curable, Water-Based Urethane Acrylate Coatings with Aluminum Oxide Powder on a Separator A UV-curable, water-based urethane acrylate binder composition was prepared and mixed with aluminum oxide powder in the proportions shown below in Table 3 to form a slurry.

TABLE 3

UV-curable, water-based urethane acrylate coating with aluminum oxide powder

| Ingredient | Manufacturer | Chemical Description | Weight % |
|---|---|---|---|
| Neorad R-440 | DSM NeoResins | Dispersed Urethane acrylate | 34.8 |
| Tego 750W | Evonik | Dispersing Agent | 2.2 |
| BYK-028 | BYK Chemie | Silicone Defoamer | 0.2 |
| Irgacure 500 | BASF | Photoinitiator | 1.9 |
| Irgacure 819-W | BASF | Photoinitiator | 0.9 |
| 26R-020212UP2 | Advanced Materials, LLC | Aluminum Oxide Powder, 0.5-1 µm | 60.0 |
| | | total | 100.0 |

The resulting slurry from Table 3 was applied on 25-µm microporous PP\PE\PP trilayer separator film (CELGARD 2325). Single-sided and double-sided patterned coatings were achieved with a 120 lpi trihelical anilox. As in Example 1, the coated separators were tested in a NMC-Lithium metal half-cell. Results in Tables 4 and 5 and FIGS. 11A and 12A demonstrate that the single-sided and double-sided ceramic pattern coated separators function in a lithium ion battery. FIGS. 11B and 12B show the coated separator allows lithium ion charging and discharging at rates from 0.1 to at least 2 C. At these rates, the coating is not impeding ion flow over that of the uncoated separator (FIG. 4B). FIGS. 11C and 12C show the battery successfully charging and discharging over 50 cycles.

Figure 11A:
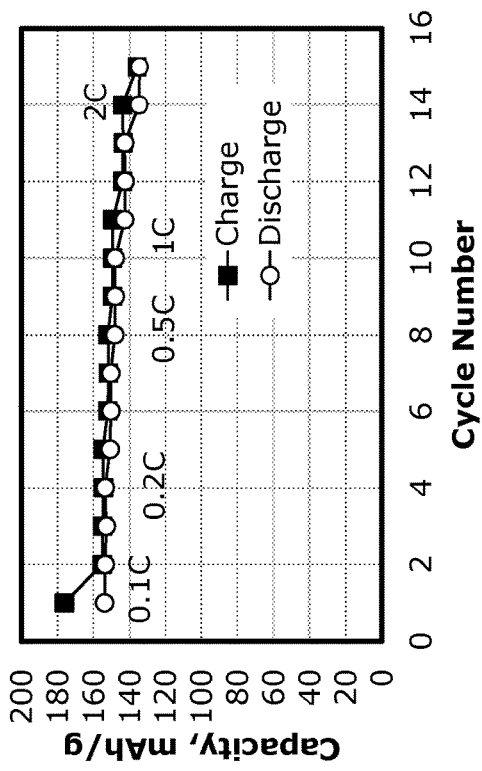
FIG. 11A illustrates the voltage profile of a coated separator according to one or more embodiments.
Figure 11B:
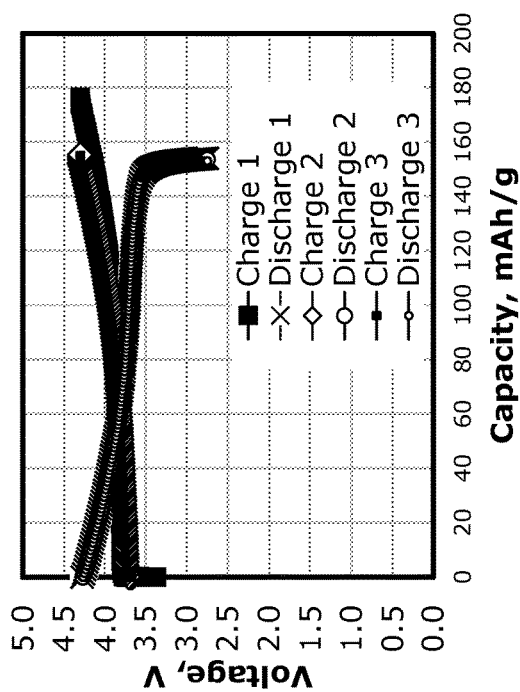
FIG. 11B illustrates the charge rate performance of a coated separator according to one or more embodiments.
Figure 11C:
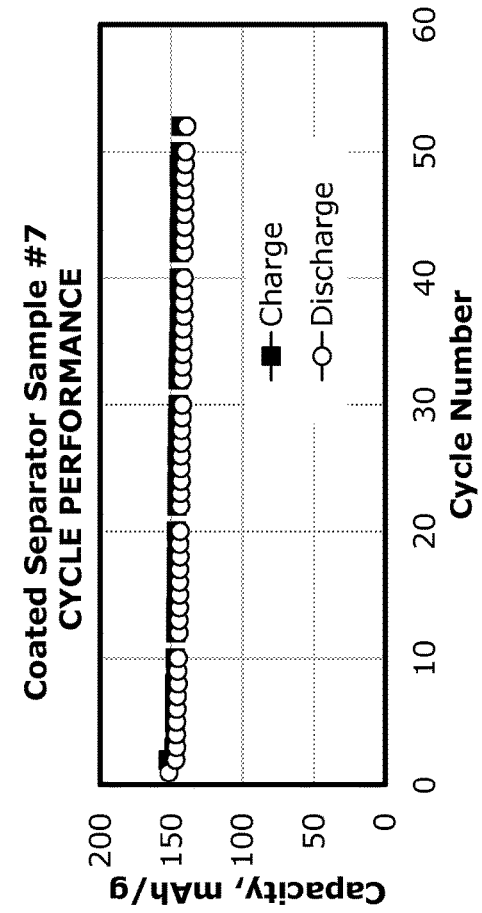
FIG. 11C illustrates the cycle performance of a coated separator according to one or more embodiments.

FIGS. 11A, 11B and 11C illustrate the voltage profile (C/10), charge rate performance and cycle performance (C/5), respectively, of the coated separator of Sample #7. The trilayer separator of Sample #7 was pattern coated on a single side with a 4-8 μm thick coating of the aluminum oxide filled UV coating of Table 3.

TABLE 4

Coin Cell Test Results, UV ceramic water-based urethane acrylate, single-sided pattern, coated separator compared to uncoated control separator

| Cycle # | Charge, mAh | Discharge, mAh | Charge, mAh/g | Discharge, mAh/g | AhEff, % |
|---|---|---|---|---|---|
| 1 | 2.15 | 1.88 | 176 | 154 | 87 |
| 2 | 1.90 | 1.88 | 155 | 154 | 99 |
| 3 | 1.89 | 1.87 | 155 | 153 | 99 |
| Control—uncoated separator | | | | | |
| 1 | 2.03 | 1.82 | 176 | 159 | 90 |

FIGS. 12A, 12B and 12C illustrate the voltage profile (C/10), charge rate performance and cycle performance (C/5), respectively, of the coated separator of Sample #8. The trilayer separator of Sample #8 was pattern coated on both sides with an 8 μm thick coating of the aluminum oxide filled UV coating of Table 3 per side.

TABLE 5

Coin Cell Test Results, UV ceramic water-based urethane acrylate, two-sided pattern, coated separator compared to uncoated control separator

| Cycle # | Charge, mAh | Discharge, mAh | Charge, mAh/g | Discharge, mAh/g | AhEff, % |
|---|---|---|---|---|---|
| 1 | 2.24 | 1.95 | 180 | 156 | 87 |
| 2 | 1.96 | 1.94 | 157 | 156 | 99 |
| 3 | 1.96 | 1.94 | 157 | 156 | 99 |
| Control—uncoated separator | | | | | |
| 1 | 2.03 | 1.82 | 176 | 159 | 90 |

Example 3: UV-Curable, Aluminum Oxide-Filled Rubber Acrylate Coatings on Separator A UV-curable composition was prepared and mixed with aluminum oxide powder in the proportions shown below in Table 6 to form a slurry. This highly-filled product contains neither solvent nor water.

TABLE 6

UV-curable, acrylated rubber coating with aluminum oxide powder

| Ingredient | Manufacturer | Chemical Description | Weight % |
|---|---|---|---|
| SR307 | Sartomer | Acrylated rubber | 10 |
| SR306 | Sartomer | Acrylated monomer | 10 |
| SR454 | Sartomer | Acrylated monomer | 12 |
| Solsperse 39000 | Noveon | Dispersant | 3.5 |
| TPO-L | BASF | Photoinitiator | 0.5 |
| Irgacure 1173 | BASF | Photoinitiator | 4.0 |
| 26R-020212UP2 | Advanced Materials, LLC | Aluminum Oxide Power, 0.5-1 μm | 60 |
| | | total | 100 |

The resulting slurry from Table 6 was applied on a 25-μm microporous PP\PE\PP trilayer separator film designed for use in lithium ion batteries (CELGARD 2325).

A continuous porous coating was made to the trilayer separator of Sample #6. In contrast, the trilayer separator of Sample #5 was pattern coated. The trilayer separator of Sample #5 was pattern coated on both sides with the coating of Table 6, while the trilayer separator of Sample #6 was continuous coated on both sides with the coating of Table 6.

Double-sided continuous coatings were applied with a #1 K bar rod using an RK Control Koater. The coatings were then cured on a Miltec MUVI conveyor with one single Miltec MPI-400 lamp equipped with a Miltec 380-0004 UV bulb at a conveyor speed of 150 feet per minute. This resulted in UV-cured aluminum oxide coatings that were 4-6 μm-thick per side.

Double-sided patterned coatings were achieved with a flexographic handproofer from Parmco. The positions of the anilox and the rubber roller were reversed such that the applied pattern was that of the anilox and not the smooth coating that might result from the rubber roller. A 200 line per inch (lpi) 5.3 bcm anilox was used. This resulted in a 2-4 μm-thick aluminum oxide filled UV coating per side.

Both the ceramic coating resulting from continuous coating and the ceramic coating resulting from pattern coating appeared uniform, stable, and strongly adhered to the separator. Samples of coated and uncoated 25-μm microporous PP\PE\PP trilayer separator films were placed in an oven at 100° C. The uncoated sample curled and showed signs of partial melting, becoming clear in spots. The coated samples remained flat and with very little curl.

An uncoated separator was assembled into an 18650 Lithium ion coin cell. The cathode was a standard 14 mg/cm$^2$ NMC coated aluminum. The anode was lithium metal. The cell was charged and discharged at a C/10 rate. FIGS. 4A, 4B and 4C illustrate the voltage profile (C/10), charge rate performance and cycle performance (C/5), respectively, of the uncoated reference separator.

Figure 9:
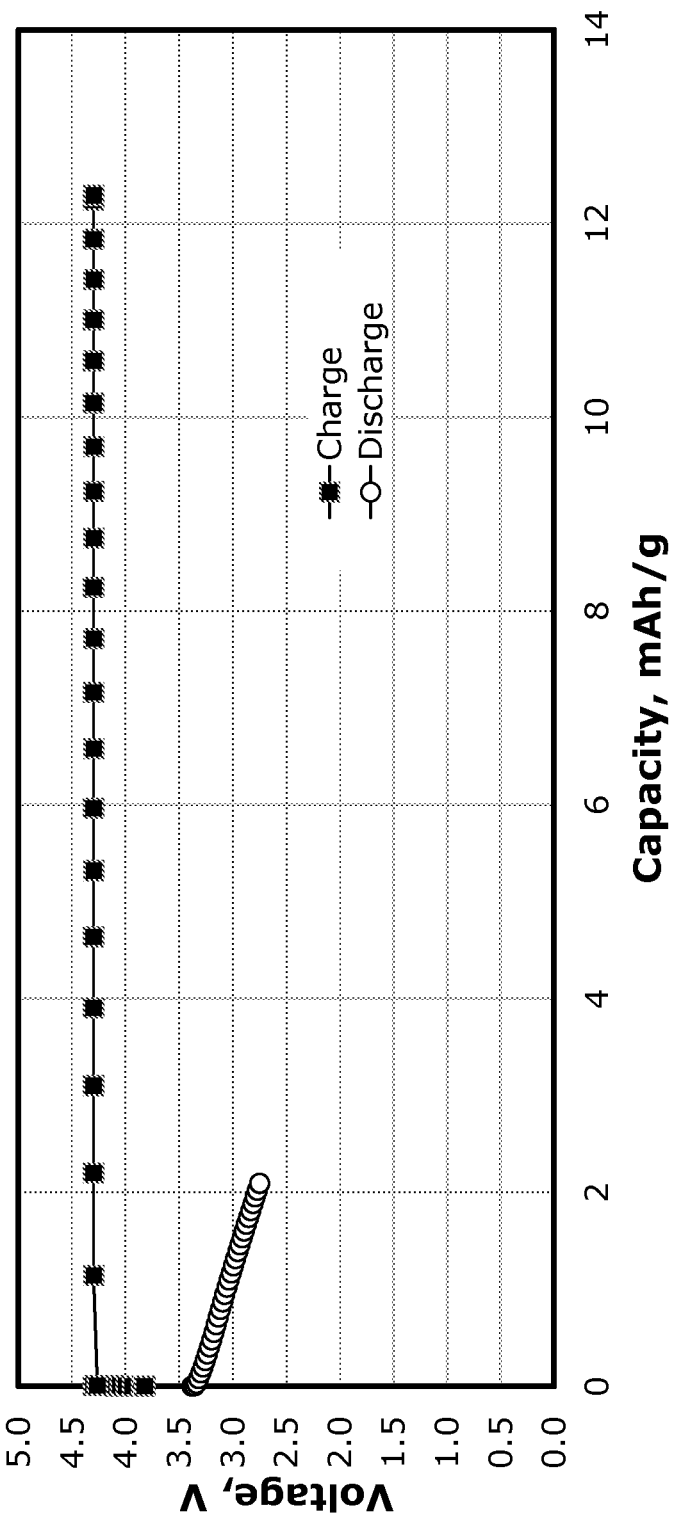
FIG. 9 illustrates the voltage profile of a coated separator according to one or more embodiments.

The coated separator samples were assembled into an 18650 Lithium ion coin cell. The cathode was a standard 14 mg/cm$^2$ NMC coated aluminum. The anode was lithium metal. The cells were charged and discharged at a C/10 rate. FIGS. 9 and 10 illustrate the voltage profile of coated separator Samples #5 and #6, respectively. As shown in the voltage profiles (C/10) of FIGS. 9 and 10, the coin cell batteries utilizing the coated separators were capable of being charged and discharged.

In addition, the slurry of Table 6 was also applied to one side of a 25-μm microporous PP\PE\PP trilayer separator using a Little Joe Proofer. This proofer mimics the offset printing process. In this case, a solid coating was applied with a 0.4 mil wedge plate used to maintain the coating thickness. This resulted in a uniform, thin, 1 μm-thick aluminum oxide filled UV coating on one side of the trilayer separator.

Figure 13A:
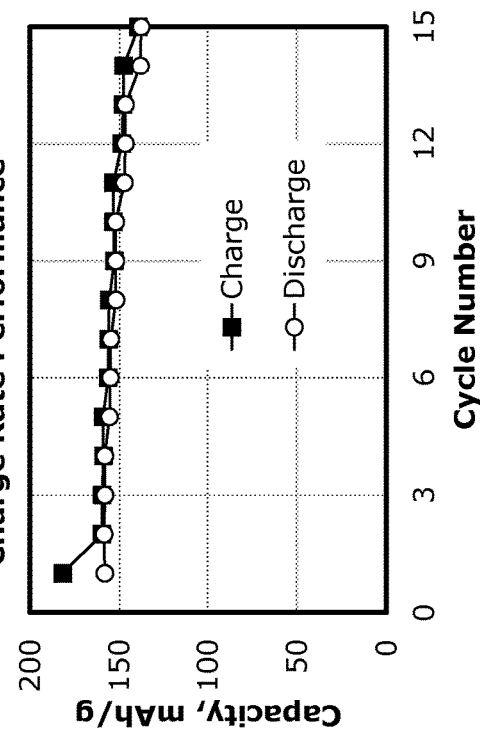
FIG. 13A illustrates the voltage profile of a coated separator according to one or more embodiments.
Figure 13B:
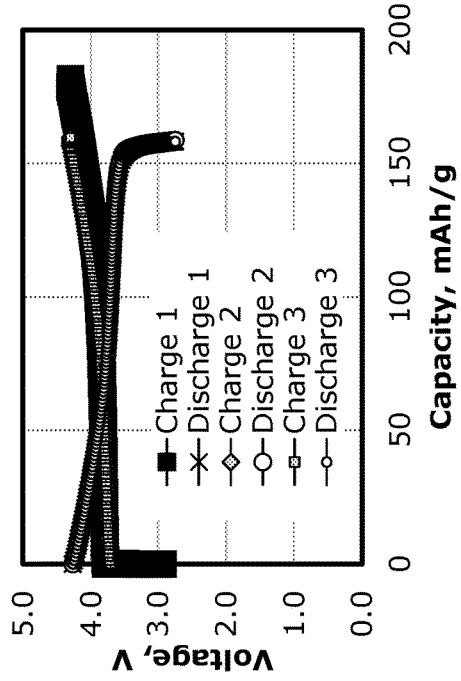
FIG. 13B illustrates the charge rate performance of a coated separator according to one or more embodiments.
Figure 13C:
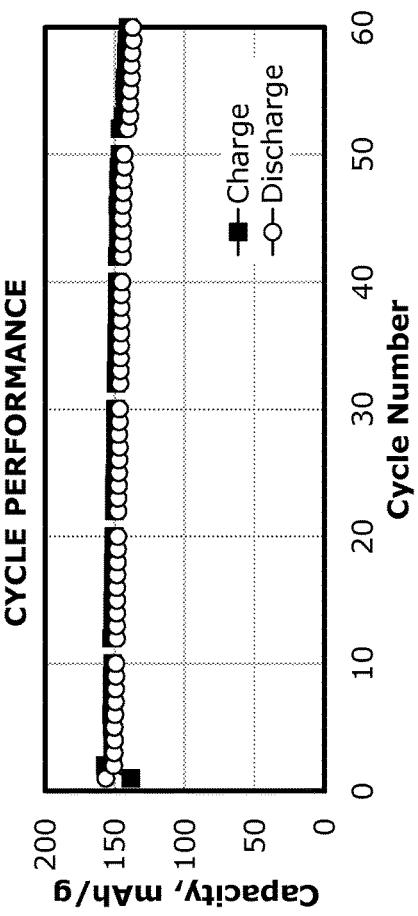
FIG. 13C illustrates the cycle performance of a coated separator according to one or more embodiments.

As in the above examples, the coated separator (Sample #9) was tested in a NMC-Lithium metal half-cell. FIGS. 13A, 13B and 13C illustrate the voltage profile (C/10), charge rate performance and cycle performance (C/5), respectively, of the coated separator of Sample #9. Results in Table 7 and FIG. 13A demonstrate the coated separator functions in a lithium ion battery. FIG. 13B shows this ceramic-rubber coated separator allows lithium-ion charging and discharging at 0.1 C to 2 C rates, and FIG. 13C shows the battery fully charging and discharging over 50 cycles.

TABLE 7

Coin Cell Test Results, UV ceramic acrylated rubber coated separator, single-side printed, compared to uncoated control separator

| Cycle # | Charge, mAh | Discharge, mAh | Charge, mAh/g | Discharge, mAh/g | AhEff, % |
|---|---|---|---|---|---|
| 1 | 2.09 | 1.82 | 182 | 158 | 87 |
| 2 | 1.83 | 1.82 | 160 | 159 | 99 |
| 3 | 1.83 | 1.82 | 159 | 158 | 99 |
| Control—uncoated separator | | | | | |
| 1 | 2.03 | 1.82 | 176 | 159 | 90 |

The resulting slurry of Table 6 was also applied on a 25-μm microporous PP\PE\PP trilayer separator (CELGARD 2325) using an anilox roller. A single-sided pattern coating was made. The patterned coatings were achieved with a 220 lpi pyramidal anilox. This resulted in a 3-8 μm thick aluminum oxide filled UV coating.

Figure 14A:
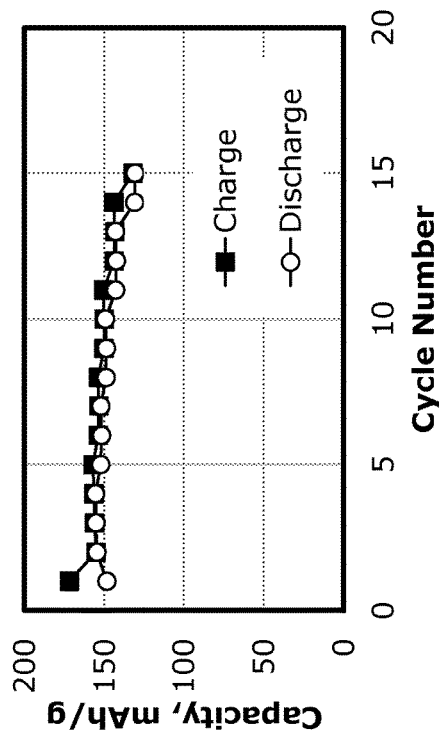
FIG. 14A illustrates the voltage profile of a coated separator according to one or more embodiments.
Figure 14B:
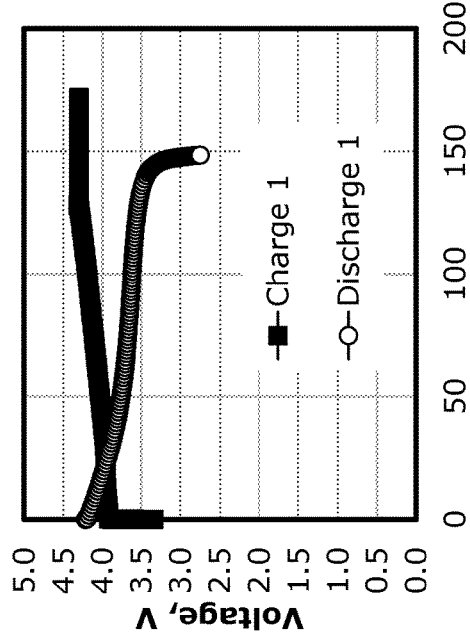
FIG. 14B illustrates the charge rate performance of a coated separator according to one or more embodiments.
Figure 14C:
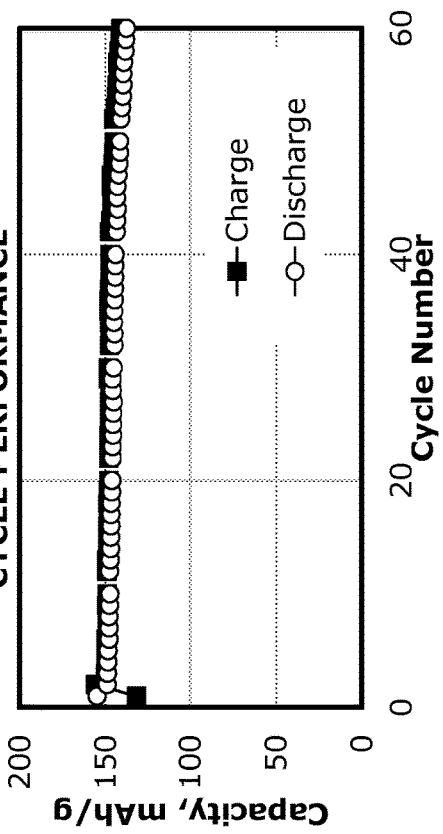
FIG. 14C illustrates the cycle performance of a coated separator according to one or more embodiments.

As in the above examples, the coated separator (Sample #10) was tested in a NMC-Lithium metal half-cell. FIGS. 14A, 14B and 14C illustrate the voltage profile (C/10), charge rate performance and cycle performance (C/5), respectively, of the coated separator of Sample #10. Results in Table 8 and FIG. 14A demonstrate the coated separator functions in a lithium ion battery. FIG. 14B shows this ceramic-rubber coated separator allows lithium-ion charge and discharge rates of 0.1 to 2 C, and FIG. 14C shows the battery charging and discharging over 50 cycles.

TABLE 8

Coin Cell Test Results, UV ceramic acrylated rubber coated separator, pattern printed, compared to uncoated control separator

| Cycle # | Charge, mAh | Discharge, mAh | Charge, mAh/g | Discharge, mAh/g | AhEff, % |
|---|---|---|---|---|---|
| 1 | 2.06 | 1.78 | 172 | 149 | 86 |
| Control—uncoated separator | | | | | |
| 1 | 2.03 | 1.82 | 176 | 159 | 90 |

Example 4: Cross-Linked Acrylic Coating with Aluminum Oxide on Separator

In addition to UV crosslinking, some embodiments cross-link UV and other water-based polymers with chemical crosslinkers for greater adhesion and chemical resistance. Table 9 shows an example of a water-based acrylic coating filled with aluminum oxide. In this case, zinc oxide is added to provide crosslinking of the acrylic resin.

TABLE 9

Cross-linked, water-based acrylic coating with aluminum oxide powder

| Ingredient | Manufacturer | Chemical Description | Weight % |
|---|---|---|---|
| Joncryl LMV 7031 | BASF | Acrylic resin in water | 11.2 |
| Joncryl HR 1620 | BASF | Acrylic resin in water | 11.2 |
| Joncryl 2660 | BASF | Acrylic resin in water | 10.4 |
| Tamol 1254 | Dow Chemical | Poly carboxylic acid dispersant | 4.0 |
| Ammonia 26° | BASF | pH adjuster | 1.2 |
| Zinc Oxide | BASF | crosslinker | 2.0 |
| 26R-020212UP2 | Advanced Materials, LLC | Aluminum Oxide Powder, 0.5-1 μm | 60.0 |
| | | total | 100.0 |

The resulting slurry from Table 9 was applied on a 25-μm microporous PP\PE\PP trilayer separator film (CELGARD 2325). Single and double sided patterned coatings were made.

The patterned coatings were achieved with a flexographic hand proofer from Pamarco. The positions of the anilox and the rubber roller were reversed such that the applied pattern was that of the anilox and not the smooth coating that might result from the rubber roller. A 120 lpi, 21.5 bcm trihelical anilox was used. This resulted in a 4-8 μm-thick aluminum oxide filled UV coating. For example, separator Sample #11 was pattern coated on a single side with a 4-8 μm-thick aluminum oxide filled UV coating, while separator Sample #12 was pattern coated on both sides with an 8 μm-thick aluminum oxide filled UV coating. The ceramic coatings of both Sample #11 and Sample #12 were stable and strongly adhered to the separator.

Figure 15A:
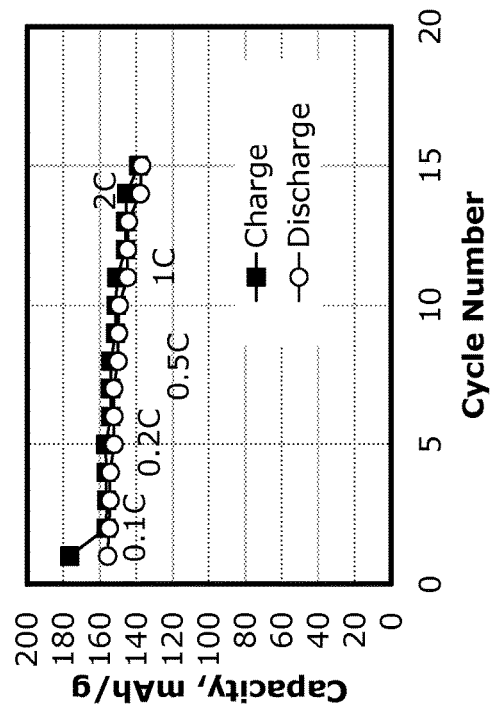
FIG. 15A illustrates the voltage profile of a coated separator according to one or more embodiments.
Figure 15B:
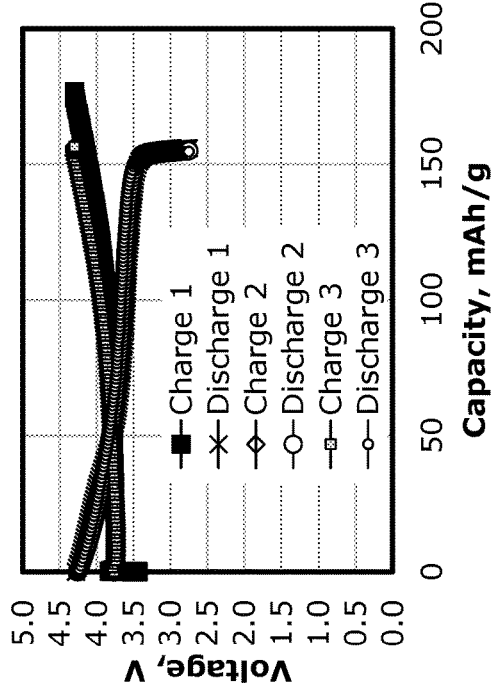
FIG. 15B illustrates the charge rate performance of a coated separator according to one or more embodiments.
Figure 15C:
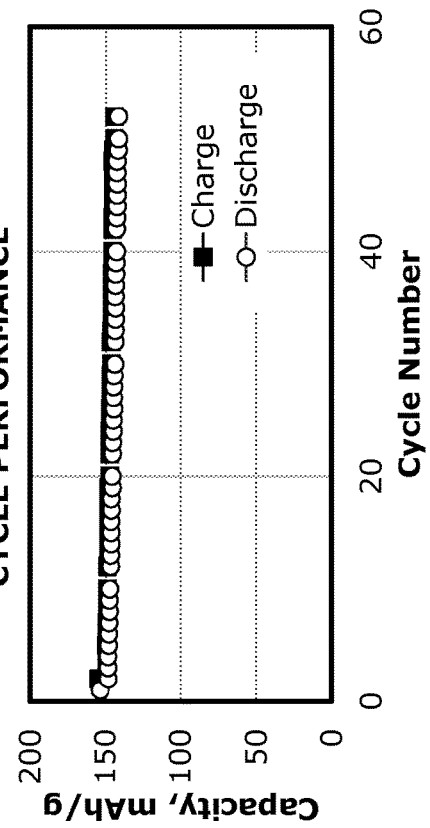
FIG. 15C illustrates the cycle performance of a coated separator according to one or more embodiments.

As in the above examples, the coated separator samples were tested in a NMC-Lithium metal half-cell. FIGS. 15A, 15B and 15C illustrate the voltage profile (C/10), charge rate performance and cycle performance (C/5), respectively, of the coated separator of Sample #11. Results in Table 10 and FIG. 15A demonstrate the single side coated separator (Sample #11) functions in a lithium ion battery. FIG. 15B shows this coated separator allows lithium-ion charge and discharge rates from 0.1 C to at least 2 C, and FIG. 15C shows the battery charging and discharging over 50 cycles.

TABLE 10

Coin Cell Test Results, Cross-linked ceramic acrylic coated separator, single side pattern, compared to uncoated control separator

| Cycle # | Charge, mAh | Discharge, mAh | Charge, mAh/g | Discharge, mAh/g | AhEff, % |
|---|---|---|---|---|---|
| 1 | 2.11 | 1.86 | 177 | 156 | 88 |
| 2 | 1.87 | 1.85 | 157 | 155 | 99 |
| 3 | 1.87 | 1.85 | 156 | 155 | 99 |
| Control—uncoated separator | | | | | |
| 1 | 2.03 | 1.82 | 176 | 159 | 90 |

Figure 16A:
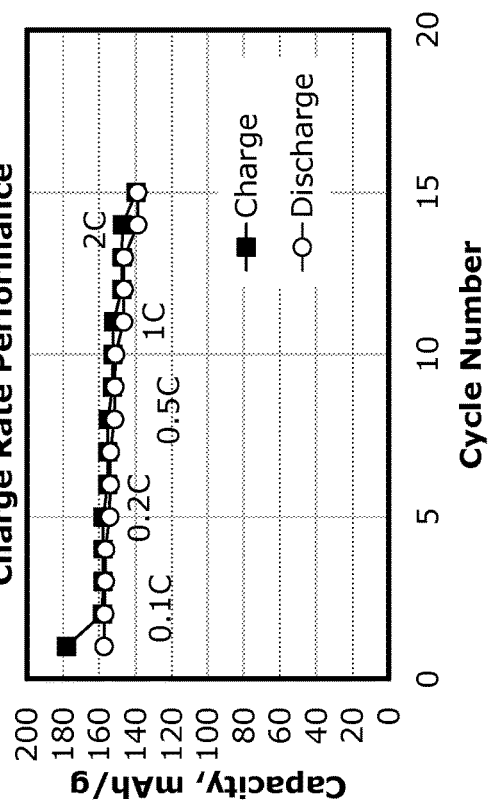
FIG. 16A illustrates the voltage profile of a coated separator according to one or more embodiments.
Figure 16B:
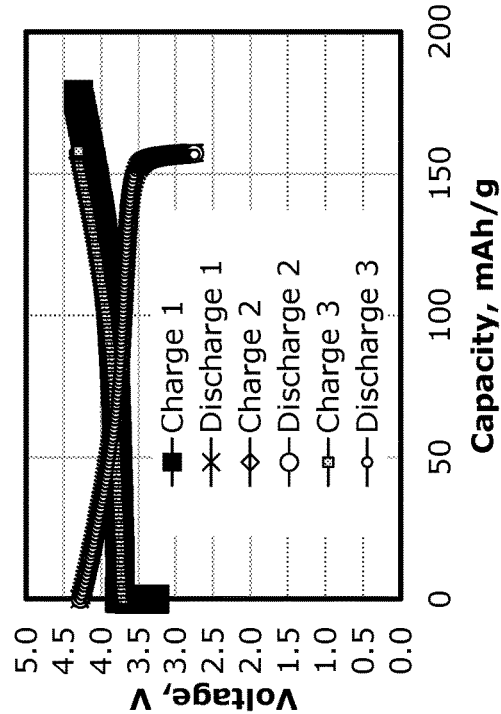
FIG. 16B illustrates the charge rate performance of a coated separator according to one or more embodiments.
Figure 16C:
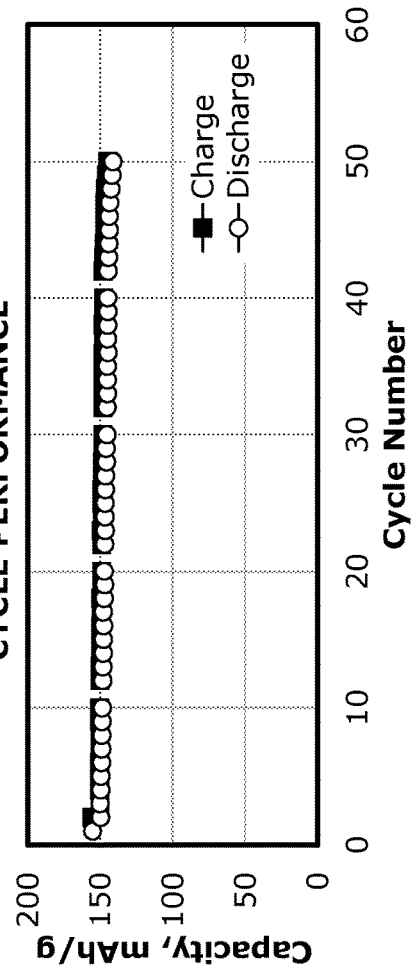
FIG. 16C illustrates the cycle performance of a coated separator according to one or more embodiments.

FIGS. 16A, 16B and 16C illustrate the voltage profile (C/10), charge rate performance and cycle performance (C/5), respectively, of the coated separator of Sample #12. Results in Table 11 and FIG. 16A demonstrate this type of two-sided coated separator (Sample #12) also functions in a lithium ion battery. FIG. 16B shows this coated separator allows lithium-ion charge and discharge rates from 0.1 C to at least 2 C, and FIG. 16C shows the battery charging and discharging over 50 cycles.

TABLE 11

Coin Cell Test Results, Cross-linked ceramic acrylic coated separator, double-sided pattern, compared to uncoated control separator

| Cycle # | Charge, mAh | Discharge, mAh | Charge, mAh/g | Discharge, mAh/g | AhEff, % |
|---|---|---|---|---|---|
| 1 | 2.17 | 1.92 | 178 | 157 | 88 |
| 2 | 1.93 | 1.92 | 158 | 157 | 99 |
| 3 | 1.93 | 1.91 | 158 | 157 | 99 |
| Control—uncoated separator | | | | | |
| 1 | 2.03 | 1.82 | 176 | 159 | 90 |

Example 5: UV Curable Aluminum Oxide Filled Cycloaliphatic Epoxy Coatings on Separator A UV curable composition was prepared and mixed with aluminum oxide powder in the proportions shown below in Table 12 to form a slurry. This highly-filled product contains neither solvent nor water.

TABLE 12

UV Curable, Cycloaliphatic Epoxy coating with aluminum oxide powder

| Chemical | Chemical Description | Weight % |
|---|---|---|
| 3,4-Epoxycyclohexylmethyl 3,4-epoxycyclohexane carboxylate | Cycloaliphatic Epoxy oligomer | 38 |
| Mixed Triarylsulfonium Hexafluorophosphate Salts in 50% propylene carbonate | Cationic Photoinitiator | 2 |
| 26R-020212UP2 Advanced Materials, LLC | Aluminum Oxide Powder, 0.5-1 µm | 60 |
| total | | 100 |

The resulting slurry from Table 12 was applied on a 25-µm microporous PP\PE\PP trilayer separator film designed for use in lithium ion batteries (CELGARD 2325). This liquid slurry did not contain a dispersing agent and was much higher in viscosity (~15,000-25,000 cP) to allow letterpress or offset printing applications.

Single-sided continuous coatings were applied with Little Joe press to mimic an offset press application. A 0.4 mil wedge plate was used to maintain the coating thickness. The coatings were then cured on a Miltec MUVI conveyor with one single Miltec MPI-400 lamp equipped with a Miltec 380-0004 UV bulb at a conveyor speed of 150 feet per minute. This resulted in a continuous cured aluminum oxide coating with no pattern that was 4-8 µm-thick (Sample #13).

Figure 17A:
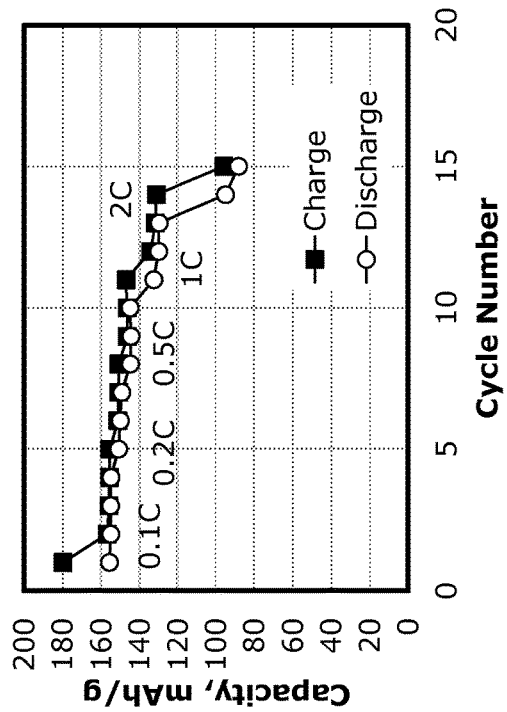
FIG. 17A illustrates the voltage profile of a coated separator according to one or more embodiments.
Figure 17B:
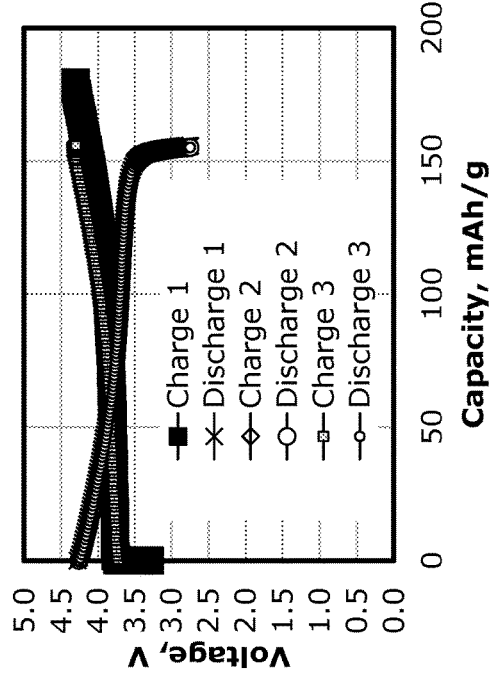
FIG. 17B illustrates the charge rate performance of a coated separator according to one or more embodiments.
Figure 17C:
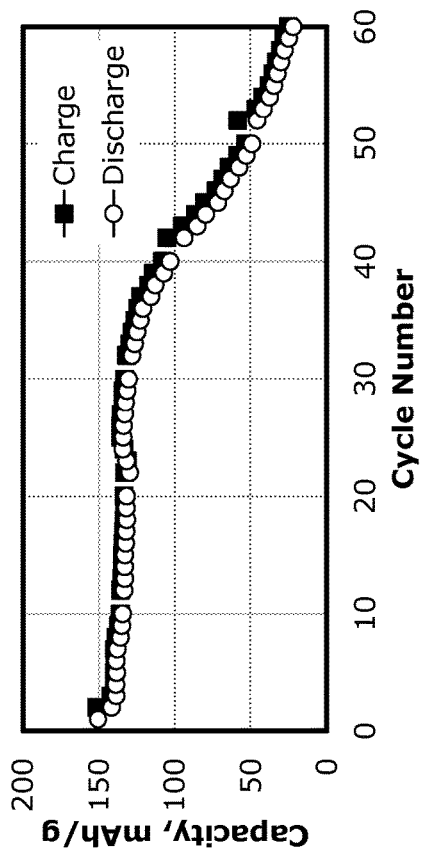
FIG. 17C illustrates the cycle performance of a coated separator according to one or more embodiments.

As in the above examples, the coated separator samples were tested in a NMC-Lithium metal half-cell. FIGS. 17A, 17B and 17C illustrate the voltage profile (C/10), charge rate performance and cycle performance (C/5), respectively, of the coated separator of Sample #13. Table 13 and FIG. 17A show the results of electrochemical half-cell testing. Table 13 and FIG. 17A demonstrate that the NMC cathode-Li anode battery can be charged at C/10 with this coated separator. FIG. 17B shows this ceramic-epoxy coated separator allows lithium-ion charge and discharge rates from 0.1 C to at least 2 C. FIG. 17C shows the lithium ion half-cell battery charges and discharges over 50 cycles.

TABLE 13

Coin Cell Test Results, UV Ceramic Cycloaliphatic Epoxy coated separator, single side, compared to uncoated control separator

| Cycle # | Charge, mAh | Discharge, mAh | Charge, mAh/g | Discharge, mAh/g | AhEff, % |
|---|---|---|---|---|---|
| 1 | 2.26 | 1.96 | 180 | 156 | 87 |
| 2 | 1.97 | 1.95 | 157 | 155 | 99 |
| 3 | 1.96 | 1.95 | 156 | 155 | 100 |
| Control—uncoated separator | | | | | |
| 1 | 2.03 | 1.82 | 176 | 159 | 90 |

In certain embodiments, solvent may be necessary to reduce the viscosity of the UV epoxy in order to apply it with an anilox to mimic the flexographic and printing gravure processes. Table 14 shows a slurry formula change according to one or more embodiments. In such slurry, a mixture of two solvents was added. One solvent evaporated rapidly and the other solvent evaporated slowly to avoid the coating drying on the anilox roll.

TABLE 14

UV Curable cationic epoxy coating with aluminum oxide powder

| Ingredient | Manufacturer | Chemical Description | Weight % Liquid Mixture | Weight % Cured Coating |
|---|---|---|---|---|
| Doublemer 421P | Double Bond Chemical | Cycloaliphatic Epoxy oligomer | 8.75 | 10.29 |
| Doublecure 1190 | Double Bond Chemical | Cationic Photoinitiator | 1.00 | 1.18 |
| Solsperse 41000 | Noveon | Dispersing agent | 3.00 | 3.53 |
| n-Propanol | Nexo | Fast evaporating solvent | 12.00 | 0.00 |
| Glycol ether | Dow Chemical | Slow evaporating solvent | 3.00 | 0.00 |
| 26R-801 | Advanced Materials, LLC | Aluminum Oxide Powder, 0.5-1 µm | 72.25 | 85.00 |
| total | | | 100.00 | 100.00 |

The resulting slurry from Table 14 was applied on a 25-µm microporous PP\PE\PP trilayer separator film (CELGARD 2325). A single-sided pattern coating was made. The patterned coating was achieved with a 220 lpi pyramidal anilox. This resulted in a 2-3 µm-thick aluminum oxide filled UV coating (Sample #14).

Figure 18B:
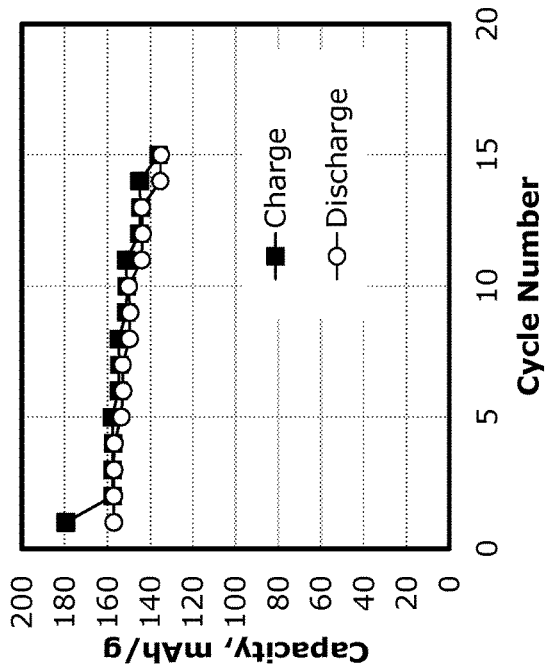
FIG. 18B illustrates the charge rate performance of a coated separator according to one or more embodiments.
Figure 18C:
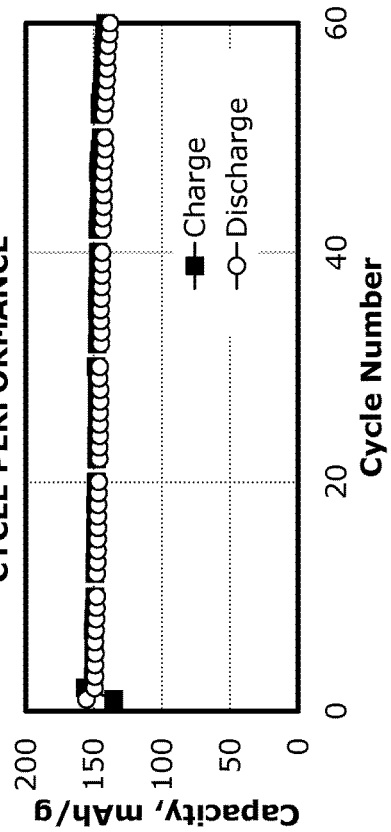
FIG. 18C illustrates the cycle performance of a coated separator according to one or more embodiments.
Figure 18A:
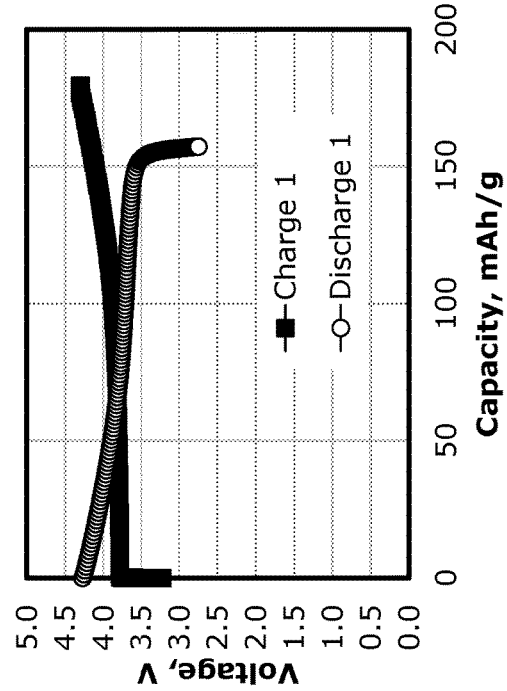
FIG. 18A illustrates the voltage profile of a coated separator according to one or more embodiments.

As in the above examples, the coated separator was tested in a NMC-Li metal half-cell. FIGS. 18A, 18B and 18C illustrate the voltage profile (C/10), charge rate performance and cycle performance (C/5), respectively, of the coated separator of Sample #14. Results in Table 15 and FIG. 18A demonstrate this coated separator functions in a lithium ion battery. FIG. 18B shows this coated separator allows lithium-ion charge and discharge rates from 0.1 C to at least 2 C, and FIG. 18C shows the battery charging and discharging with no issues over 50 cycles.

TABLE 15

Coin Cell Test Results, UV Ceramic Cycloaliphatic Epoxy pattern control separator, single side, compared to uncoated control separator

| Cycle # | Charge, mAh | Discharge, mAh | Charge, mAh/g | Discharge, mAh/g | AhEff, % |
|---|---|---|---|---|---|
| 1 | 2.21 | 1.94 | 179 | 157 | 88 |
| | | Control—uncoated separator | | | |
| 1 | 2.03 | 1.82 | 176 | 159 | 90 |

Example 6: UV Curable Silicone Coating

Another example of the wide range of UV-curable chemistries that can be applied, according to various embodiments, includes silicones. The silicones may, for example, be terminated with acrylates, vinyls, cycloaliphatic epoxides, or a combination thereof. A UV-curable cycloaliphatic is shown in Table 16.

TABLE 16

UV cationic silicone coating with aluminum oxide powder

| Ingredient | Manufacturer | Chemical Description | Weight % |
|---|---|---|---|
| UV Poly 206 | Bluestar Silicones | Cycloaliphatic epoxy silicone with photoinitiator | 60 |
| Alumina 7955.05 | Saint Gobain | Aluminum oxide powder, 0.5 um | 40 |
| | | total | 100 |

The resulting slurry from Table 16 was applied to a 25-μm microporous PP\PE\PP trilayer separator film (CELGARD 2325). Single-sided pattern coatings were made. The patterned coatings were achieved with a 120 lpi trihelical anilox. This resulted in an 8 μm-thick aluminum oxide filled UV coating (Sample #15).

Figure 19B:
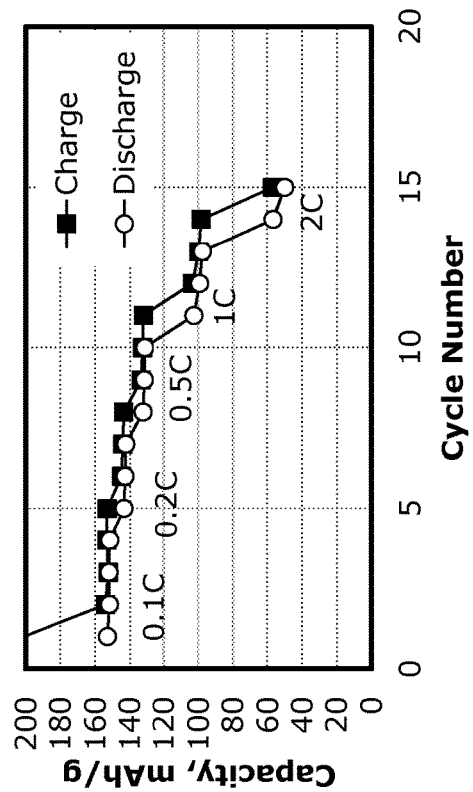
FIG. 19B illustrates the charge rate performance of a coated separator according to one or more embodiments.
Figure 19C:
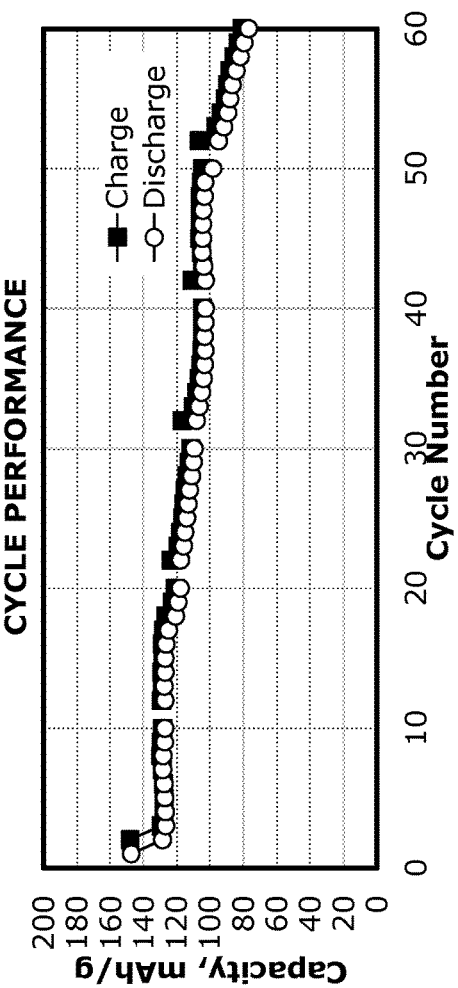
FIG. 19C illustrates the cycle performance of a coated separator according to one or more embodiments.
Figure 19A:
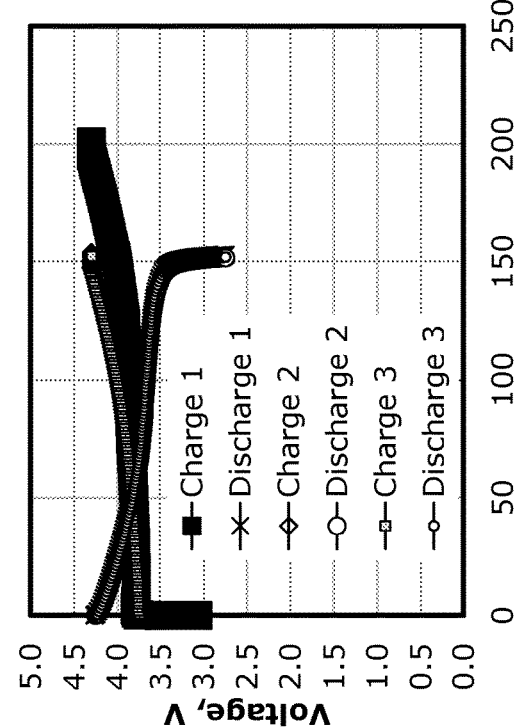
FIG. 19A illustrates the voltage profile of a coated separator according to one or more embodiments.

As in the above examples, the coated separator was tested in a NMC-Li metal half-cell. FIGS. 19A, 19B and 19C illustrate the voltage profile (C/10), charge rate performance and cycle performance (C/5), respectively, of the coated separator of Sample #15. Results in Table 17 and FIG. 19A demonstrate the coated separator functions in a lithium ion battery. FIG. 19B shows this coated separator allows lithium-ion charge and discharge rates from 0.1 C to at least 2 C, and FIG. 19C shows the battery charging and discharging over 50 cycles.

TABLE 17

Coin Cell Test Results, UV ceramic cationic silicone coated separator, single side pattern, compared to uncoated control separator

| Cycle # | Charge, mAh | Discharge, mAh | Charge, mAh/g | Discharge, mAh/g | AhEff, % |
|---|---|---|---|---|---|
| 1 | 2.35 | 1.78 | 201 | 153 | 76 |
| 2 | 1.80 | 1.77 | 154 | 152 | 99 |
| 3 | 1.78 | 1.77 | 152 | 152 | 100 |
| | | Control—uncoated separator | | | |
| 1 | 2.03 | 1.82 | 176 | 159 | 90 |

Example 7: UV Urethane Coating

Another example of the wide range of UV-curable chemistries that can be applied, according to various embodiments, includes all forms of urethane acrylates. The urethanes may, for example, be terminated with (meth) acrylates, vinyls, or a combination thereof. A UV-curable ceramic coating formula is shown in Table 18.

TABLE 18

UV Curable urethane acrylate coating with aluminum oxide powder

| Ingredient | Manufacturer | Chemical Description | Weight % Liquid Mixture | Weight % Cured Coating |
|---|---|---|---|---|
| CN973J75 | Sartomer | Aliphatic urethane acrylate | 3.19 | 3.75 |
| CN9890 | Sartomer | Melamine acrylate | 1.91 | 2.25 |
| Solsperse 41000 | Noveon | Dispersing agent | 1.28 | 1.50 |
| SR306 | Sartomer | acrylate monomer | 1.91 | 2.25 |
| SR454 | Sartomer | acrylate monomer | 3.19 | 3.75 |
| Irgacure 184 | BASF | Photoinitiator | 1.02 | 1.20 |
| TPO-L | BASF | Photoinitiator | 0.26 | 0.30 |
| n-Propanol | Nexo | Solvent | 15.00 | 0.00 |
| 26R801 | Advanced Materials, LLC | Aluminum Oxide Powder, 0.5-1 μm | 72.25 | 85.00 |
| | | | 100.00 | 100.00 |

The resulting slurry from Table 18 was applied on a 25-μm microporous PP\PE\PP trilayer separator film (CELGARD 2325). A single-sided coating was made. The continuous and patterned coatings were achieved with a 150 lpi trihelical anilox. This resulted in a 9-14 μm-thick aluminum oxide filled UV coating. For instance, the separator of Sample #16 was coated on a single side with a 9 μm-thick continuous coating of the UV ceramic urethane acrylate coating of Table 18, while the separator of Sample #17 was pattern coated on a single side with an 11 μm-thick coating of the UV ceramic urethane acrylate coating of Table 18.

Figure 20B:
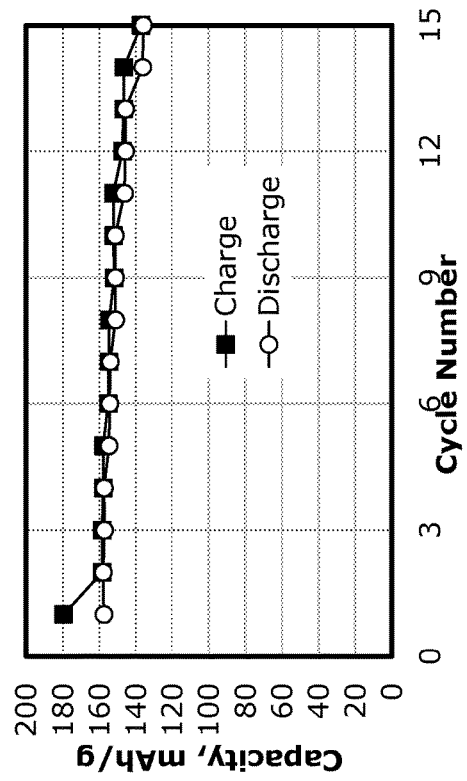
FIG. 20B illustrates the charge rate performance of a coated separator according to one or more embodiments.
Figure 20C:
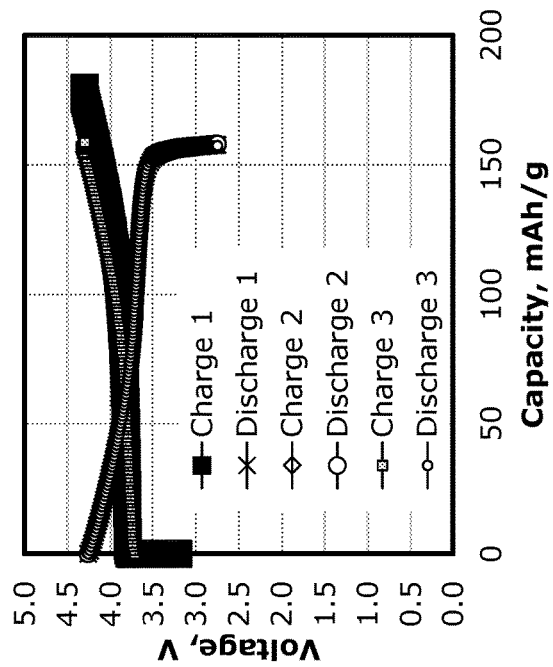
FIG. 20C illustrates the cycle performance of a coated separator according to one or more embodiments.
Figure 20A:
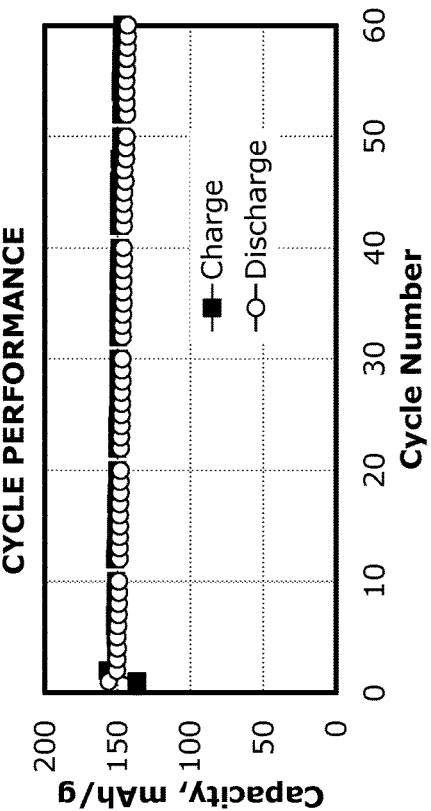
FIG. 20A illustrates the voltage profile of a coated separator according to one or more embodiments.
Figure 21A:
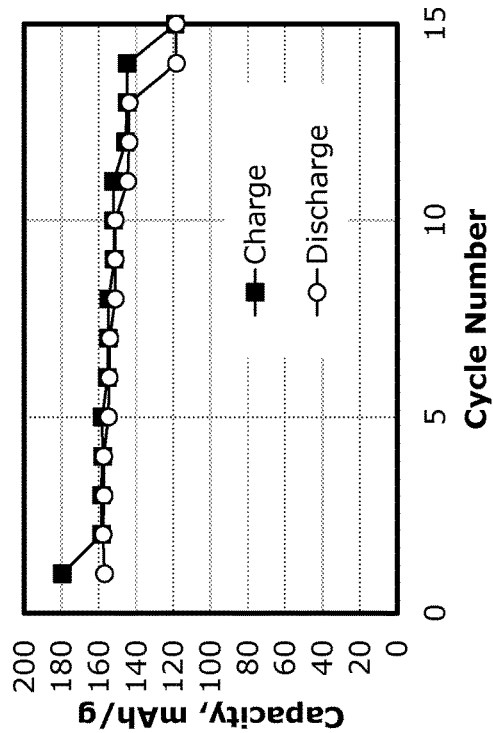
FIG. 21A illustrates the voltage profile of a coated separator according to one or more embodiments.
Figure 21B:
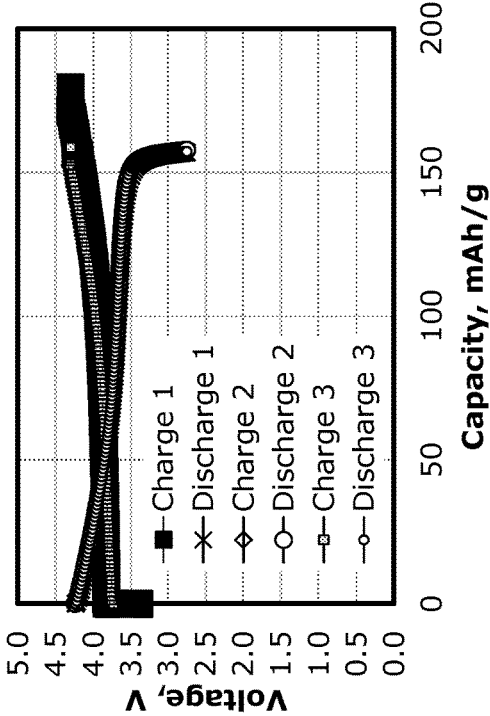
FIG. 21B illustrates the charge rate performance of a coated separator according to one or more embodiments.
Figure 21C:
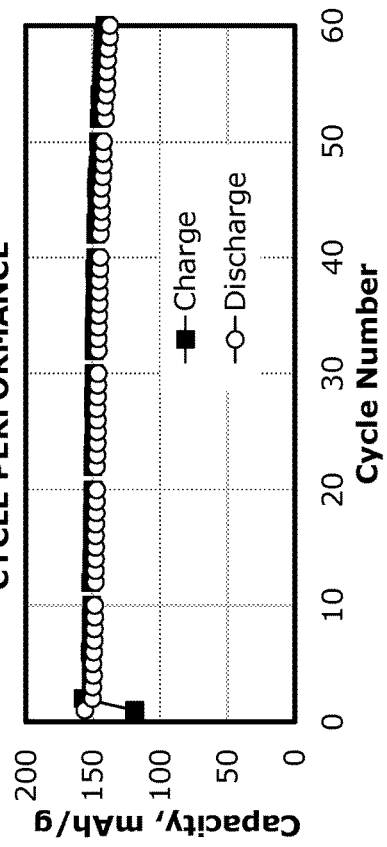
FIG. 21C illustrates the cycle performance of a coated separator according to one or more embodiments.

As in the above examples, the coated separators were tested in a NMC-Li metal half-cell. FIGS. 20A, 20B and 20C illustrate the voltage profile (C/10), charge rate performance and cycle performance (C/5), respectively, of the coated separator of Sample #16. FIGS. 21A, 21B and 21C illustrate the voltage profile (C/10), charge rate performance and cycle performance (C/5), respectively, of the coated separator of Sample #17. Results in Tables 19 and 20 and FIG. 20A (Sample #16—single side continuous coating) and FIG. 21A (Sample #17—single side pattern coating) demonstrate these UV-cured ceramic coated separators function in a lithium ion battery.

TABLE 19

Coin Cell Test Results, UV ceramic urethane acrylate coated separator, single side continuous, compared to uncoated control separator

| Cycle # | Charge, mAh | Discharge, mAh | Charge, mAh/g | Discharge, mAh/g | AhEff, % |
|---|---|---|---|---|---|
| 1 | 2.15 | 1.88 | 180 | 158 | 88 |
| 2 | 1.89 | 1.89 | 159 | 158 | 100 |
| 3 | 1.89 | 1.88 | 159 | 157 | 99 |
| | | Control—uncoated separator | | | |
| 1 | 2.03 | 1.82 | 176 | 159 | 90 |

TABLE 20

Coin Cell Test Results, UV ceramic urethane acrylate coated separator, single side pattern, compared to uncoated control separator

| Cycle # | Charge, mAh | Discharge, mAh | Charge, mAh/g | Discharge, mAh/g | AhEff, % |
|---|---|---|---|---|---|
| 1 | 2.07 | 1.81 | 180 | 157 | 87 |
| 2 | 1.83 | 1.82 | 159 | 158 | 100 |
| 3 | 1.83 | 1.81 | 159 | 157 | 99 |
| Control—uncoated separator | | | | | |
| 1 | 2.03 | 1.82 | 176 | 159 | 90 |

Both FIGS. 20B and 21B show these ceramic-urethane coated separators have the porosity to allow lithium-ion charge and discharge rates from 0.1 C to at least 2 C, and FIGS. 20C and 21C show the battery charging and discharging over 50 cycles.

Example 8: UV Polyester Coating

Another example of the wide range of UV-curable chemistries that can be applied, according to various embodiments, includes all forms of polyester acrylates. The polyesters may, for example, be terminated with (meth)acrylates, vinyls, or a combination thereof. A UV-curable polyester and urethane ceramic coating formula is shown in Table 21.

TABLE 21

UV Curable polyester acrylate coating with aluminum oxide powder

| Ingredient | Manufacturer | Chemical Description | Weight % Liquid Mixture | Weight % Cured Coating |
|---|---|---|---|---|
| CN973J75 | Sartomer | Aliphatic urethane acrylate | 3.2 | 3.75 |
| CN3150 | Sartomer | Polyester acrylate | 1.9 | 2.3 |
| Solsperse | Noveon | Dispersing agent | 1.3 | 1.5 |
| SR306 | Sartomer | Acrylate monomer | 1.9 | 2.3 |
| SR454 | Sartomer | Acrylate monomer | 3.2 | 3.8 |
| Irgacure 184 | BASF | Photoinitiator | 1.0 | 1.2 |
| TPO-L | BASF | Photoinitiator | 0.3 | 0.3 |
| n-Propanol | Nexo | Solvent | 15.00 | — |
| 26R801 | Advanced Materials, LLC | Aluminum Oxide Powder, 0.5-1 μm | 72.3 | 85.0 |
| | | | 100.0 | 100.0 |

The resulting slurry from Table 21 was applied on a 25-μm microporous PP\PE\PP trilayer separator film (CELGARD 2325). A single-sided pattern coating was made. The patterned coating was produced with a 165 lpi Pyramidal anilox. This resulted in a 9 μm-thick aluminum oxide filled UV coating (Sample #18).

Figure 22B:
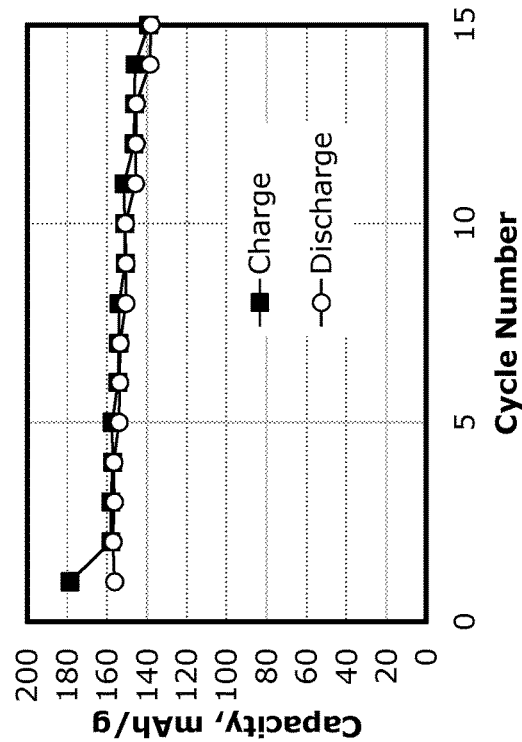
FIG. 22B illustrates the charge rate performance of a coated separator according to one or more embodiments.
Figure 22C:
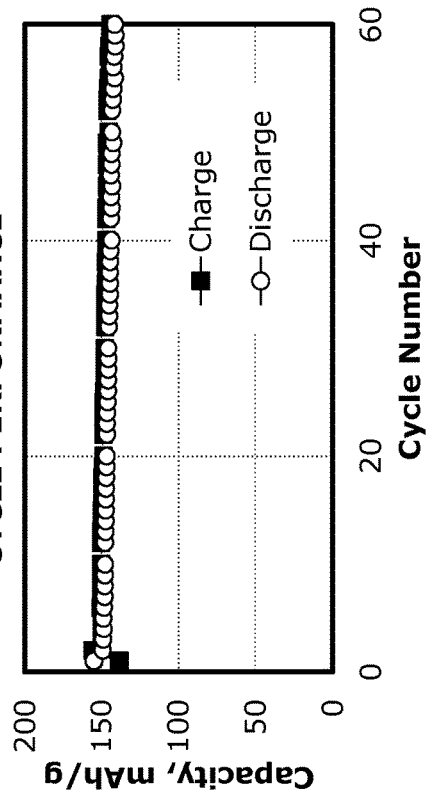
FIG. 22C illustrates the cycle performance of a coated separator according to one or more embodiments.
Figure 22A:
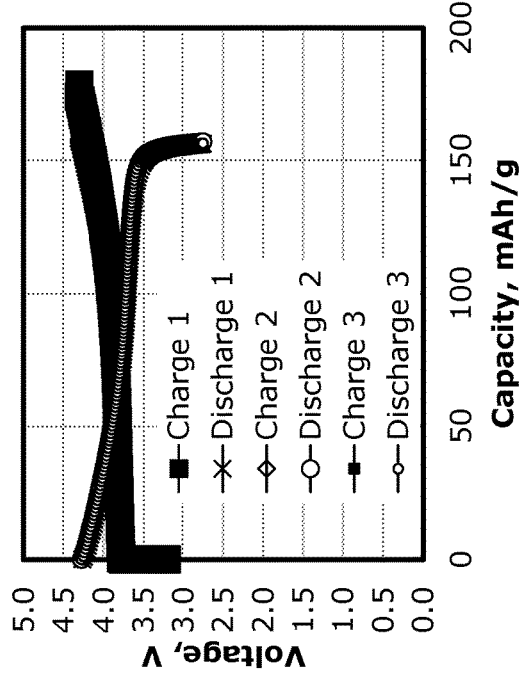
FIG. 22A illustrates the voltage profile of a coated separator according to one or more embodiments.

As in the above examples, the coated separator was tested in a NMC-Li metal half-cell. FIGS. 22A, 22B and 22C illustrate the voltage profile (C/10), charge rate performance and cycle performance (C/5), respectively, of the coated separator of Sample #18. Electrochemical results in Table 22 and FIG. 22A demonstrate this coated separator functions in a lithium ion battery. FIG. 22B shows this ceramic-polyester coated separator allows lithium-ion charge and discharge rates from 0.1 C to at least 2 C, and FIG. 22C shows the battery charging and discharging over 50 cycles.

TABLE 22

Coin Cell Test Results, UV ceramic polyester urethane acrylate pattern coated separator, single-sided, compared to uncoated control separator

| Cycle # | Charge, mAh | Discharge, mAh | Charge, mAh/g | Discharge, mAh/g | AhEff, % |
|---|---|---|---|---|---|
| 1 | 1.99 | 1.74 | 179 | 156 | 87 |
| 2 | 1.76 | 1.75 | 158 | 157 | 99 |
| 3 | 1.76 | 1.74 | 158 | 156 | 99 |
| Control—uncoated separator | | | | | |
| 1 | 2.03 | 1.82 | 176 | 159 | 90 |

Although aluminum oxide is used to illustrate certain variations, various embodiments are suitable for the preparation of any coated separator disclosed herein, using any of the ceramic particulate materials disclosed herein. With the benefit of the present disclosure, one skilled in the art will recognize that various process parameters may need to be adjusted to compensate for the use of a different ceramic particulate material.

While certain variations have been described with respect to specific formulations, those skilled in the art will appreciate that there are numerous variations and permutations of the above described systems and techniques that fall within the spirit and scope of the disclosure as set forth in the appended claims.

Various embodiments provide numerous advantages over the prior art, including, but not limited to:

1. The present method is a faster and less expensive process for manufacturing a coated battery (e.g., lithium secondary battery) separator.
2. The present process is safer than prior art coating methods. In some embodiments, the present method is completely solvent free. In another embodiment, solvent is used, but a less toxic solvent and in a significantly lower amount than is used in prior art coating methods. In yet another embodiment, a completely harmless solvent (water) is used.
3. The present UV or EB process creates a thermosetting network binding the ceramic particles to the cured binder matrix and to the separator. The advantage of a thermosetting network is that it will not melt away and has much higher thermal resistance than what would be achieved with a thermoplastic network.
4. The present method may be integrated in-line with extrusion equipment. Because the present method reinforces the strength of the separator film, this in-line integration allows the production of thinner separators. A thinner separator with greater fire protection will result in a smaller battery and thinner separator will also have greater ionic conductivity due to the short path which results in faster charge and discharge cycles—all with less heat being generated in the battery.
5. The present embodiments may allow the coating to be applied before the separator is biaxially orientated to increase porosity. In this way, the coating could be applied, the film stretched and there would be less interference with the pores of the separator.
6. Some present embodiments permit the use of patterned coatings or porous solid coatings or a combination of the two. The use of patterned coatings applied with printing techniques produces a reproducible network of ceramic insulators on the separator. This has the advantage of minimizing interference with the pores in the separator. In this way, the battery will have more power, i.e., it is capable of charging and discharging faster than a separator coated with the same ceramic thickness but relying on solvent evaporative porosity to produce an ionic electrolyte path through the ceramic coating.
7. The present process allows for the coating of multiple layers so that there are no straight-line paths from the anode to the cathode through the separator.

The disclosure is not to be limited in scope by the specific embodiments disclosed in the examples. The specific embodiments disclosed in the examples are intended as illustrations of a few aspects, and any embodiments that are functionally equivalent are within the scope of this disclosure. Indeed, various modifications of various embodiments in addition to those shown and described herein will become apparent and are intended to fall within the scope of the appended claims.

Although lithium ion batteries are used to illustrate certain variations, various embodiments are suitable for the preparation of any battery disclosed herein, using any of the cured coated separator components disclosed herein. With the benefit of the present disclosure, one skilled in the art will recognize that various process parameters may need to be adjusted to compensate for the use of a different battery component.

The terms used in the present specification shall be understood to have the meaning usually used in the field of art to which various embodiments pertain, unless otherwise specified.

Where products are described herein as having, including, or comprising specific components, or where processes are described herein as having, including, or comprising specific process steps, it is contemplated that the products of various embodiments can also consist essentially of, or consist of, the recited components, and that the processes of various embodiments also consist essentially of, or consist of, the recited process steps.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, a numerical range of "1 to 5" should be interpreted to include not only the explicitly recited values of 1 and 5, but also individual values and sub-ranges within the indicated range. Thus, included in this numerical range are individual values such as 2, 3, 4, etc. and sub-ranges such as from 1 to 3, from 2 to 4, from 3-5, etc. The listing of illustrative values or ranges is not a disclaimer of other values or ranges between and including the upper and lower limits of a given range.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

It is noted that, as used herein and in the appended claims, the singular forms "a," "an," and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Each of the individual embodiments described and illustrated herein has discrete components and features which may be readily separated from or combined with the features of any of the other several embodiments without departing from the scope or spirit of the disclosure. Any recited method can be carried out in the order of events recited or in any other order which is logically possible.

The disclosure is not limited to particular embodiments described herein. Further, the terminology used herein is for the purpose of describing particular embodiments only, and is not intended to be limiting.

We claim:
1. A method comprising:
mixing a ceramic particulate material with a curable binder mixture comprising one or more monomers, one or more oligomers, or a combination thereof to form a slurry;
forming a coated separator according to a process that comprises applying the slurry to at least one surface of a porous separator film; and
subjecting the coated separator to ultraviolet or electron beam radiation, thereby curing the curable binder mixture into a cured thermoset network that is adhered to the porous separator film, wherein the cured thermoset network and the ceramic particulate material form a cured porous coating in which particles of the ceramic particulate material are bound to one another and to the at least one surface of the porous separator film by the cured thermoset network, and wherein the ceramic particulate material is present in an amount of 85 to 95 percent of a total weight of the cured porous coating.
2. The method according to claim 1, wherein the method further comprises:
mixing water with the ceramic particulate material and the curable binder mixture to form the slurry; and
removing the water from the slurry after the applying of the slurry to the at least one surface of the porous separator film and before the curing of the curable binder mixture.
3. The method according to claim 2, further comprising mixing, into the slurry, a photoinitiator, a free-radical initiator, a dispersant, an adhesion promoter, a wetting agent, a silane-coated particle, a dark cure additive, a co-initiator, a blowing agent, or a combination thereof.
4. The method according to claim 1, wherein the curable binder mixture comprises an ultraviolet curable water-based mixture, ultraviolet curable epoxy, ultraviolet curable silicone, ultraviolet curable urethane, ultraviolet curable rubber, ultraviolet curable thioester, acrylated water based resin blend, acrylated polyurethane, acrylated rubber, acrylated monomer, cycloaliphatic epoxy terminated oligomers, cycloaliphatic epoxy terminated monomers, acrylated terminated oligomers, acrylated terminated monomers, or a combination thereof.
5. The method according to claim 1, wherein the porous separator film includes a top surface and a bottom surface, the method comprising:

applying the slurry to the top surface or the bottom surface, but not to both the top surface and the bottom surface.

6. The method according to claim 1, wherein the step of forming the coated separator comprises applying the slurry in a non-continuous pattern partially covering the at least one surface of the porous separator film.

7. The method according to claim 1, wherein the applying of the slurry to the at least one surface of the porous separator film comprises applying the slurry in a non-continuous pattern partially covering the at least one surface of the porous separator film.

8. The method according to the claim 1, wherein the step of subjecting of the coated separator to the ultraviolet or electron beam radiation comprises passing the coated separator under an ultraviolet bulb at a rate of between 5 and 2000 feet per minute.

9. The method according to claim 1, wherein the particles of the ceramic particulate material remain bound to one another and to the porous separator film at a temperature of higher than 120° C.

10. The method according to claim 1, wherein the cured porous coating has a thickness of less than 4 µm.

11. The method according to claim 1, wherein the cured thermoset network is nonionic.

12. The method according to claim 1, wherein the porous separator film includes a top surface and a bottom surface, the method comprising applying the slurry to the top surface and to the bottom surface.

13. A method comprising:
assembling a cathode, an anode, electrolyte, and a separator to form a battery; the separator comprising a porous separator film and a cured porous coating adhered to a surface of the porous separator film; the cured porous coating comprising a ceramic particulate material bound in a crosslink reaction product thermoset network formed from exposure of one or more precursors to ultraviolet or electron beam radiation, wherein the one or more precursors are selected from one or more monomers, one or more oligomers, or combinations thereof, and wherein the thermoset network is adhered to the surface of the porous separator film by the exposure of the one or more precursors to the ultraviolet or electron beam radiation, and wherein the cured porous coating comprises the ceramic particulate material in an amount of 85 to 95 percent of a total weight of the cured porous coating.

14. The method according to claim 13, wherein the porous separator film includes a second surface, the separator further comprising a second cured porous coating adhered to the second surface of the porous separator film, the second porous coating comprising a second ceramic particulate material bound in a second thermoset network, wherein the second thermoset network is adhered to the second surface of the porous separator film, and wherein the second cured porous coating comprises the second ceramic particulate material in an amount of 85 to 95 percent of a total weight of the second cured porous coating.

15. A method comprising:
forming a coating on a porous separator film according to a process that comprises applying a slurry to the porous separator film, the slurry comprising a ceramic particulate material and a binder mixture that is curable with ultraviolet radiation and that comprises one or more monomers, one or more oligomers, or a combination thereof; and
passing the coated porous separator film under an ultraviolet bulb at a particular rate thereby polymerizing the binder mixture into a cured thermoset network and binding the cured thermoset network to the porous separator film and to the ceramic particulate material, wherein the cured thermoset network and the ceramic particulate material form a cured porous coating on the porous separator film, and wherein the ceramic particulate material is present in an amount of 85 to 95 percent of a total weight of the cured porous coating.

16. The method of claim 15, wherein the particular rate is between 5 and 2000 feet per minute.

17. The method of claim 16, further comprising:
unwinding the porous separator film at the particular rate from a first spool prior to the applying of the slurry to the porous separator film; and
winding the porous separator film with the cured porous coating thereon onto a second spool at the particular rate.

18. The method of claim 15, further comprising:
removing water or solvent from the slurry after the applying of the slurry to the porous separator film and prior to the passing of the coated porous separator film under the ultraviolet bulb.

19. The method of claim 15, wherein the step of applying of the slurry to the porous separator film comprises:
applying the slurry to the porous separator film in a non-continuous pattern partially covering a surface of the porous separator film.

20. The method of claim 15, wherein the cured porous coating is nonionic.

21. The method according to claim 15, wherein the porous separator film includes a top surface and a bottom surface, the method comprising applying the slurry to the top surface and to the bottom surface.

22. The method according to claim 15, wherein the porous separator film includes a top surface and a bottom surface, the method comprising applying the slurry to only the top surface or to the bottom surface.

* * * * *